United States Patent
Yamauchi et al.

(10) Patent No.: US 7,956,315 B2
(45) Date of Patent: Jun. 7, 2011

(54) DISCHARGE LAMP LIGHTING DEVICE, METHOD OF CONTROLLING DISCHARGE LAMP LIGHTING DEVICE, AND PROJECTOR

(75) Inventors: Kentaro Yamauchi, Ashiya (JP); Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 12/504,137

(22) Filed: Jul. 16, 2009

(65) Prior Publication Data
US 2010/0103388 A1    Apr. 29, 2010

(30) Foreign Application Priority Data
Oct. 23, 2008    (JP) ................. 2008-273003

(51) Int. Cl.
*G01J 1/44* (2006.01)
*G01J 1/32* (2006.01)
*H05B 41/16* (2006.01)
*G03B 21/20* (2006.01)

(52) U.S. Cl. ............... 250/214 R; 250/205; 315/246; 353/85

(58) Field of Classification Search ............ 250/214 R, 250/214 SW, 214 LS, 205; 315/205, 209 R, 315/246, 287, 291, 307; 353/85, 86, 87; 327/101, 427, 513, 535; 361/91.1, 103, 111
See application file for complete search history.

(56) References Cited

U.S. PATENT DOCUMENTS
7,768,215 B1 * 8/2010 Shiwei et al. ............ 315/291
7,845,805 B2 * 12/2010 Okamoto et al. ............ 353/85

FOREIGN PATENT DOCUMENTS
JP    A-1-112698    5/1989
JP    A-2006-59790    3/2006

* cited by examiner

*Primary Examiner* — Que T Le
*Assistant Examiner* — Don Williams
(74) *Attorney, Agent, or Firm* — Oliff & Berridge, PLC

(57) ABSTRACT

A discharge lamp lighting device includes: a power control circuit adapted to generate discharge lamp driving power; an alternating current conversion circuit adapted to execute polarity reversal on a direct current output from the power control circuit, thereby generating an alternating current; and a control section adapted to perform alternating current conversion control of controlling the polarity reversal timing of the alternating current, wherein the control section executes a steady drive process of executing the alternating current conversion control at a given frequency, a first low frequency drive process of executing the alternating current conversion control at a first low frequency driving frequency lower than the given frequency, and starting from a first polarity and ending with the first polarity, and a second low frequency drive process of executing the alternating current conversion control at a second low frequency driving frequency lower than the given frequency, and starting from a second polarity and ending with the second polarity.

17 Claims, 17 Drawing Sheets

FIG. 4A
FIRST POLARITY STATE P1
FIG. 4B
SECOND POLARITY STATE P2
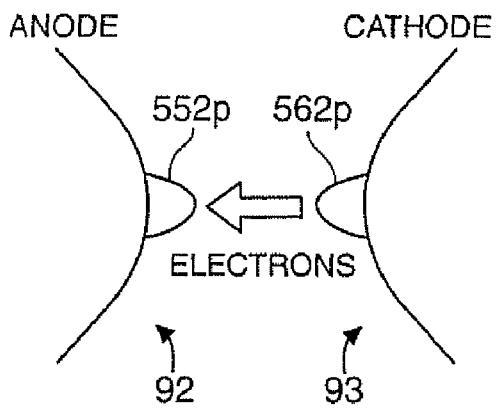
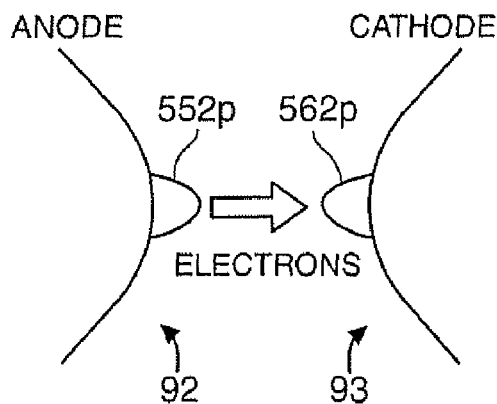
FIG. 4C
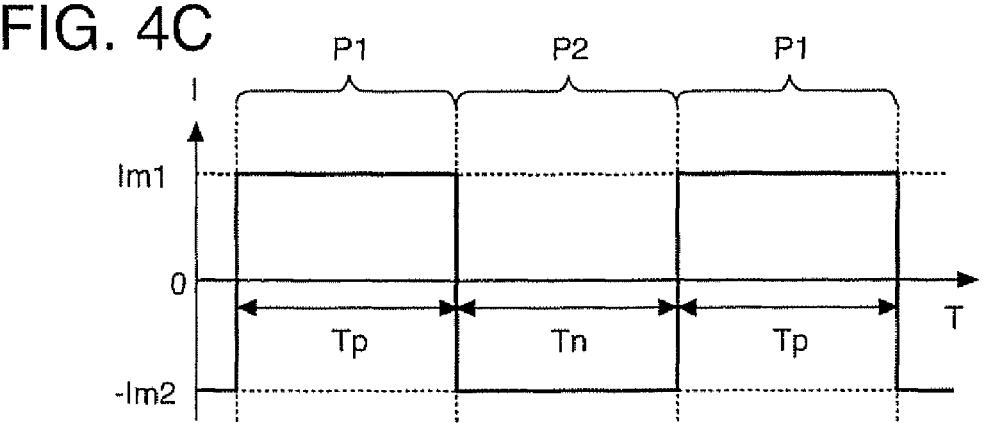
FIG. 4D
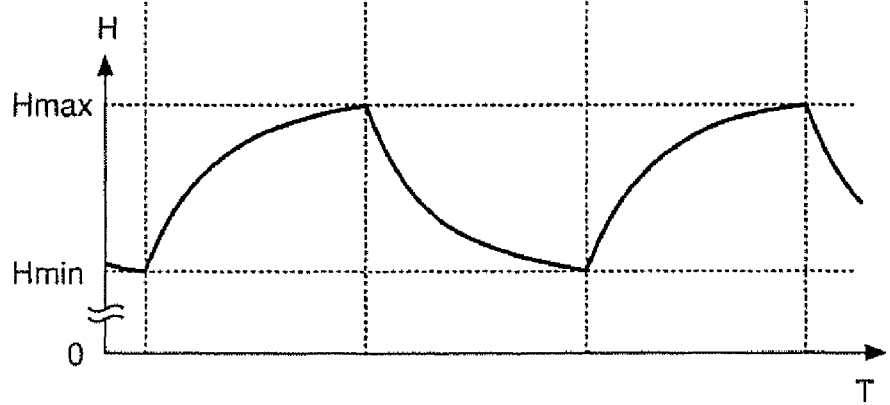

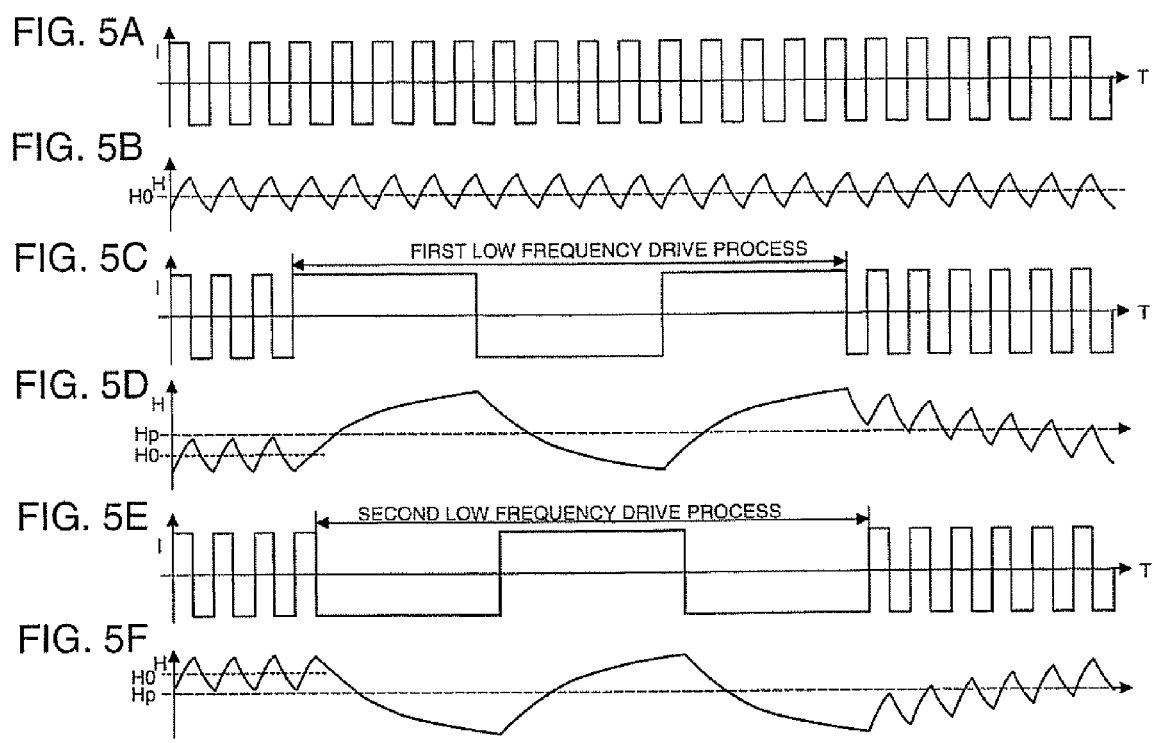

FIG. 6A

| STEADY DRIVE PROCESSING PERIOD | FIRST LOW FREQUENCY DRIVE PROCESSING PERIOD | STEADY DRIVE PROCESSING PERIOD | FIRST LOW FREQUENCY DRIVE PROCESSING PERIOD | STEADY DRIVE PROCESSING PERIOD | FIRST LOW FREQUENCY DRIVE PROCESSING PERIOD |
|---|---|---|---|---|---|
| FIRST LOW FREQUENCY WAVE INSERTION PERIOD (PERIOD 1) | | | | | |

FIG. 6B

| STEADY DRIVE PROCESSING PERIOD | SECOND LOW FREQUENCY DRIVE PROCESSING PERIOD | STEADY DRIVE PROCESSING PERIOD | SECOND LOW FREQUENCY DRIVE PROCESSING PERIOD | STEADY DRIVE PROCESSING PERIOD | SECOND LOW FREQUENCY DRIVE PROCESSING PERIOD |
|---|---|---|---|---|---|
| SECOND LOW FREQUENCY WAVE INSERTION PERIOD (PERIOD 2) | | | | | |

| VOLTAGE (V) | INSERTION INTERVAL (sec.) | NUMBER OF CYCLES (period) | FREQUENCY (Hz) |
|---|---|---|---|
| 100 AND ABOVE | 1 | 3 / 2 | 10 |
| 80 AND ABOVE LESS THAN 100 | 2 | 7 / 2 | 20 |
| 60 AND ABOVE LESS THAN 80 | 5 | 13 / 2 | 30 |
| LESS THAN 60 | NO INSERTION | NO INSERTION | NO INSERTION |

FIG. 13

DISCHARGE LAMP LIGHTING DEVICE, METHOD OF CONTROLLING DISCHARGE LAMP LIGHTING DEVICE, AND PROJECTOR

BACKGROUND

1. Technical Field

The present invention relates to a discharge lamp lighting device, a method of controlling a discharge lamp lighting device, and a projector.

2. Related Art

As a light source of a projector, there is used a discharge lamp such as a high-pressure mercury lamp or a metal halide lamp. In the discharge lamp, the shape of an electrode varies due to consumption of the electrode caused by discharge. If a plurality of projections grows on a tip section of the electrode, or irregular consumption of the electrode body progresses, migration of arc source or a variation of arc length is caused. Such phenomena cause lower luminance of the discharge lamp, and lead to shorter life of the discharge lamp, and therefore, are not preferable.

As a method of solving this problem, there is known a discharge lamp lighting device driving the discharge lamp using alternating currents with frequencies different from each other (see e.g., JP-A-2006-59790 (Document 1)).

However, even when driving the discharge lamp using the alternating currents with different frequencies, there is a possibility that stationary convection due to the emission is formed inside the discharge lamp to cause uneven consumption of the electrode or uneven precipitation of the electrode material.

SUMMARY

An advantage of some aspects of the invention is to provide a discharge lamp lighting device, a method of controlling a discharge lamp lighting device, and a projector suppressing formation of stationary convection inside the discharge lamp, thereby preventing uneven consumption of the electrode and uneven precipitation of the electrode material.

According to an aspect of the invention, there is provided a discharge lamp lighting device including a power control circuit adapted to generate discharge lamp driving power, an alternating current conversion circuit adapted to execute polarity reversal on a direct current output from the power control circuit at given timing, thereby generating and outputting an alternating current for driving the discharge lamp, and a control section adapted to perform alternating current conversion control of controlling the polarity reversal timing of the alternating current for driving the discharge lamp with respect to the alternating current conversion circuit, wherein the control section executes a steady drive process of executing the alternating current conversion control at a given frequency, a first low frequency drive process of executing the alternating current conversion control at a first low frequency driving frequency lower than the given frequency, and starting from a first polarity and ending with the first polarity, and a second low frequency drive process of executing the alternating current conversion control at a second low frequency driving frequency lower than the given frequency, and starting from a second polarity and ending with the second polarity.

According to this aspect of the invention, since the temperature difference (e.g., several tens through several hundreds of degrees) is generated between the both electrodes of the discharge lamp by executing the first low frequency drive process and the second low frequency drive process, it becomes possible to suppress the formation of the stationary convection inside the discharge lamp, and to prevent uneven consumption of the electrodes and uneven precipitation of the electrode material.

In the discharge lamp lighting device described above, it is also possible that the control section executes the alternating current conversion control of alternately repeating a first low frequency wave insertion period and a second low frequency wave insertion period, in the first low frequency wave insertion period, the control section executes a process of inserting, a plurality of times, a first low frequency drive processing period for executing the first low frequency drive process into a period of executing the steady drive process, and in the second low frequency wave insertion period, the control section executes a process of inserting, a plurality of times, a second low frequency drive processing period for executing the second low frequency drive process into the period of executing the steady drive process.

In the discharge lamp lighting device described above, it is also possible that the control section executes the alternating current conversion control of varying at least one of an interval of insertion of the first low frequency drive processing period inserted in the first low frequency wave insertion period and an interval of insertion of the second low frequency drive processing period inserted in the second low frequency wave insertion period.

In the discharge lamp lighting device described above, it is also possible that the control section executes the alternating current conversion control of varying at least one of a number of cycles included in the first low frequency drive processing period and a number of cycles included in the second low frequency drive processing period.

In the discharge lamp lighting device described above, it is also possible that the control section executes the alternating current conversion control of varying at least one of the first low frequency driving frequency and the second low frequency driving frequency.

In the discharge lamp lighting device described above, it is also possible that the discharge lamp includes a first electrode functioning as an anode in the first polarity, a second electrode functioning as the anode in the second polarity, a main reflecting mirror disposed on a side of the first electrode, and adapted to reflect a light beam generated by discharge between the first electrode and the second electrode and emit the light beam toward an illuminated area, and a sub-reflecting mirror disposed on a side of the second electrode so as to be opposed to the main reflecting mirror, and adapted to reflect a light beam from an inter-electrode space between the first electrode and the second electrode, toward a side of the inter-electrode space.

In the discharge lamp lighting device described above, it is also possible that the control section executes the alternating current conversion control of setting the interval of insertion of the second low frequency drive processing period inserted in the second low frequency wave insertion period to be longer than the interval of insertion of the first low frequency drive processing period inserted in the first low frequency wave insertion period.

In the discharge lamp lighting device described above, it is also possible that the control section executes the alternating current conversion control of setting the number of cycles included in the second low frequency drive processing period to be larger than the number of cycles included in the first low frequency drive processing period.

In the discharge lamp lighting device described above, it is also possible that the control section executes the alternating current conversion control of setting the second low frequency driving frequency to be higher than the first low frequency driving frequency.

In the discharge lamp lighting device described above, it is also possible that the control section executes the alternating current conversion control of setting a length of time of at least one of a first 1/2 cycle and a last 1/2 cycle in the first low frequency drive processing period and the second low frequency drive processing period larger than a length of time of any other 1/2 cycle in the first low frequency drive processing period and the second low frequency drive processing period.

In the discharge lamp lighting device described above, it is also possible that the control section executes, on the power control circuit, current control of controlling a current value of a direct current output by the power control circuit, and in the current control, the control section executes control of setting a maximum current value in at least one of a first 1/2 cycle and a last 1/2 cycle in the first low frequency drive processing period and the second low frequency drive processing period larger than any other current value in the first low frequency drive processing period and the second low frequency drive processing period.

In the discharge lamp lighting device described above, it is also possible that an electrode condition detection section adapted to detect an electrode condition of the discharge lamp is further provided, and the control section executes the alternating current conversion control based on the electrode condition.

As the electrode condition, there can be cited a discharge lamp drive voltage, a discharge lamp drive current, light intensity of the discharge lamp, and combinations of any of these items.

According to another aspect of the invention, there is provided a control method of a discharge lamp lighting device including a power control circuit adapted to generate discharge lamp driving power, and an alternating current conversion circuit adapted to generate and output an alternating current for driving the discharge lamp by executing polarity reversal on a direct current output by the power control circuit at given timing, generating and outputting the alternating current for driving the discharge lamp at a given frequency, generating and outputting the alternating current at a first low frequency driving frequency lower than the given frequency, and starting from a first polarity and ending with the first polarity, and generating and outputting the alternating current at a second low frequency driving frequency lower than the given frequency, and starting from a second polarity and ending with the second polarity.

According to another aspect of the invention, there is provided a projector including any one of the discharge lamp lighting devices described above.

BRIEF DESCRIPTION OF THE DRAWINGS

The invention will now be described with reference to the accompanying drawings, wherein like numbers reference like elements.

FIGS. 4A through 4D are explanatory diagrams showing a relationship between the polarity of drive power supplied to a discharge lamp 90 and the temperature of electrodes.

FIGS. 5A through 5F are graphs showing a relationship between an alternating current I for driving a discharge lamp and the temperature.

FIGS. 6A and 6B are diagrams for explaining a first low frequency wave insertion period (period 1) and a second low frequency wave insertion period (period 2).

FIG. 13 is a table showing an example of correspondence between a discharge lamp drive voltage Vd and each of an interval of insertion of the low frequency drive processing period, the number of cycles included in the low frequency drive processing period, and the low frequency driving frequency.

DESCRIPTION OF EXEMPLARY EMBODIMENTS

Hereinafter, preferred embodiments of the invention will be described in detail with reference to the accompanying drawings. It should be noted that the embodiments described below do not unreasonably limit the content of the invention as set forth in the appended claims. Further, all of the constituents described below are not necessarily essential elements of the invention.

1. Optical System of Projector

Figure 1:
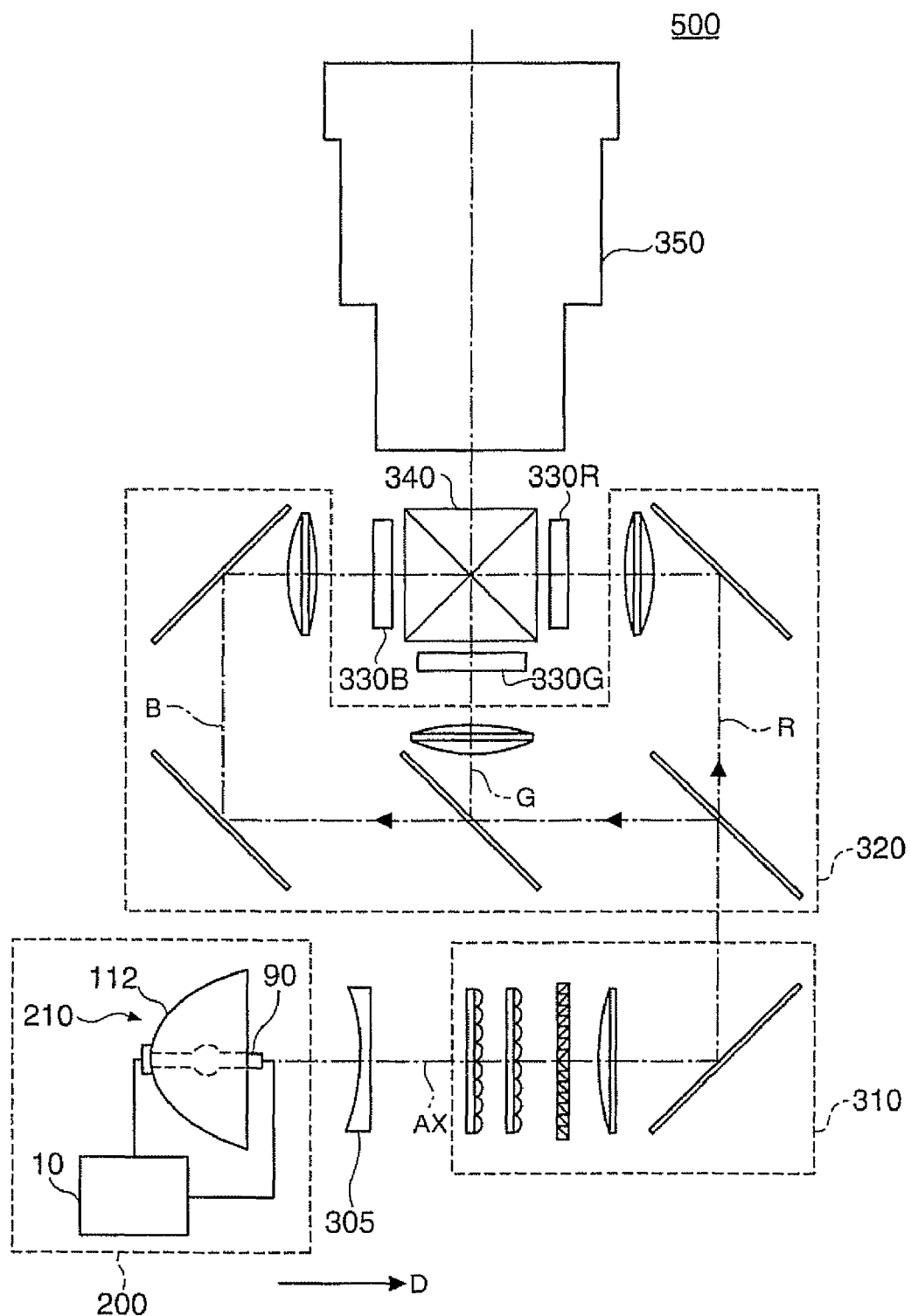
FIG. 1 is an explanatory diagram showing a projector as an embodiment of the invention.

FIG. 1 is an explanatory diagram showing a projector 500 as an embodiment of the invention. The projector 500 includes a light source device 200, a collimating lens 305, an illumination optical system 310, a color separation optical system 320, three liquid crystal light valves 330R, 330G, 330B, a cross dichroic prism 340, and a projection optical system 350.

The light source device 200 is provided with a light source unit 210 and a discharge lamp lighting device 10. The light source unit 210 includes a main reflecting mirror 112, a sub-reflecting mirror 50, and a discharge lamp 90. The discharge lamp lighting device 10 supplies the discharge lamp 90 with electrical power to light the discharge lamp 90. The main reflecting mirror 112 reflects the light emitted from the discharge lamp 90 toward an irradiation direction D. The irradiation direction D is parallel to the optical axis AX. The light from the light source unit 210 passes through the collimating lens 305 and enters the illumination optical system 310. The collimating lens 305 collimates the light from the light source unit 210.

The illumination optical system 310 equalizes the illuminance of the light from the light source device 200 in the liquid crystal light valves 330R, 330G, 330B. Further, the illumination optical system 310 uniforms the polarization direction of the light from the light source device 200 to one direction. The reason therefor is to effectively utilize the light from the light source device 200 in the liquid crystal light valves 330R, 330G, 330B. The light adjusted in the illuminance and the polarization direction enters the color separation optical system 320. The color separation optical system 320 separates the incident light into three colored light beams of red (R), green (G), and blue (B). The liquid crystal light valves 330R, 330G, 330B provided with correspondence with the respective colors modulate the three colored light beams, respectively. The liquid crystal light valves 330G, 330G, 330B are respectively provided with liquid crystal panels 560R, 560G, 560B and polarization plates disposed on both of the light entrance side and the light exit side of each of the liquid crystal panels 560R, 560G, 560B. The cross dichroic prism 340 combines the three colored light beams thus modulated. The combined light enters the projection optical system 350. The projection optical system 350 projects the incident light on a screen not shown. Thus, an image is displayed on the screen.

It should be noted that as a configuration of each of the collimating lens 305, the illumination optical system 310, the color separation optical system 320, the cross dichroic prism 340, and the projection optical system 350, various configurations well known to the public can be adopted.

Figure 2:
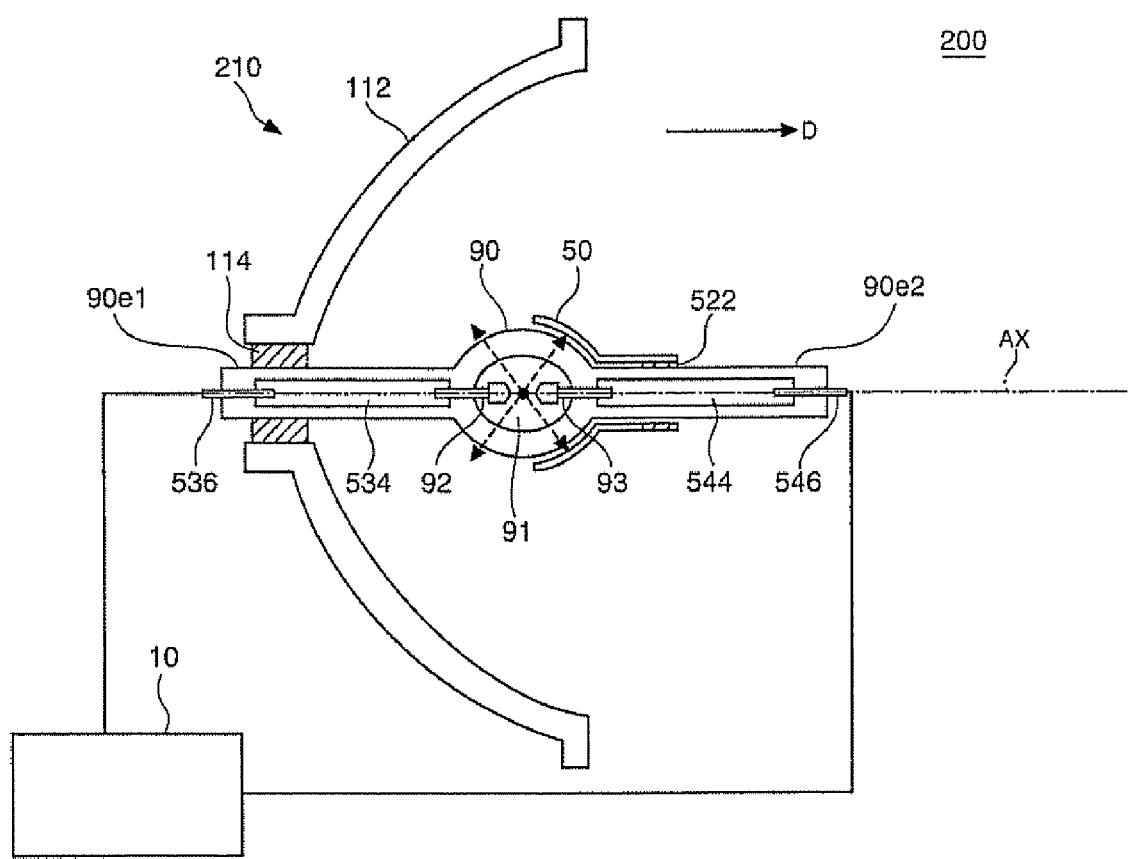
FIG. 2 is an explanatory diagram showing a configuration of a light source device.

FIG. 2 is an explanatory diagram showing a configuration of the light source device 200. The light source device 200 is provided with the light source unit 210 and the discharge lamp lighting device 10. In the drawing a cross-sectional view of the light source unit 210 is shown. The light source unit 210 includes the main reflecting mirror 112, the discharge lamp 90, and the sub-reflecting mirror 50.

The shape of the discharge lamp 90 is a rod-like shape extending from a first end 90e1 to a second end 90e2 along the irradiation direction D. A material of the discharge lamp 90 is a translucent material such as quartz glass. A center portion of the discharge lamp 90 bulges like a sphere, and a discharge space 91 is formed therein. Inside the discharge space 91, there is encapsulated a gas as a discharge medium including a noble gas, a metallic halide, and so on.

Further, inside the discharge space 91, two electrodes 92, 93 protrude from the discharge lamp 90. The first electrode 92 is disposed on the first end 90e1 side of the discharge space 91, and the second electrode 93 is disposed on the second end 90e2 side of the discharge space 91. Each of these electrodes 92, 93 has a rod-like shape extending along the optical axis AX. Inside the discharge space 91, electrode tips (also referred to as "discharge ends") of the electrodes 92, 93 are opposed to each other with a predetermined distance. It should be noted that the material of these electrodes 92, 93 is metal such as tungsten.

The first end 90e1 of the discharge lamp 90 is provided with a first terminal 536. The first terminal 536 and the first electrode 92 are electrically connected to each other via a conductive member 534 disposed through the inside of the discharge lamp 90. Similarly, the second end 90e2 of the discharge lamp 90 is provided with a second terminal 546. The second terminal 546 and the second electrode 93 are electrically connected to each other via a conductive member 544 disposed through the inside of the discharge lamp 90. The material of these terminals 536, 546 is metal such as tungsten. Further, as each of the conductive members 534, 544, molybdenum foil is used, for example.

These terminals 536, 546 are connected to the discharge lamp lighting device 10. The discharge lamp lighting device 10 supplies these terminals 536, 546 with an alternating current. As a result, arc discharge is caused between the two electrodes 92, 93. The light (discharge light) generated by the arc discharge is emitted from a discharge position in all directions as illustrated with the dashed arrows.

To the first end 90e1 of the discharge lamp 90, there is attached the main reflecting mirror 112 with a fixing member 114. A reflecting surface (a surface facing the discharge lamp 90) of the main reflecting mirror 112 has a spheroidal shape. The main reflecting mirror 112 reflects the discharge light toward the irradiation direction D. It should be noted that as the shape of the reflecting surface of the main reflecting mirror 112, various shapes for reflecting the discharge light toward the irradiation direction D can be adopted besides the spheroidal shape. A paraboloid of revolution, for example, can also be adopted. In this case, the main reflecting mirror 112 can convert the discharge light into the light roughly parallel to the optical axis AX. Therefore, the collimating lens 305 can be eliminated.

On the second end 90e2 side of the discharge lamp 90, there is attached the sub-reflecting mirror 50 with a fixing member 522. A reflecting surface (a surface facing the discharge lamp 90) of the sub-reflecting mirror 50 has a spherical shape surrounding the second end 90e2 side of the discharge space 91. The sub-reflecting mirror 50 reflects the discharge light toward the main reflecting mirror 112. Thus, the efficiency of the light emitted from the discharge space 91 can be improved.

It should be noted that as a material of the fixing members 114, 522, there can be adopted an arbitrary heat-resistant material (e.g., an inorganic adhesive) resistant to the heat generated by the discharge lamp 90. Further, as the method of fixing the arrangement of the main reflecting mirror 112 and the sub-reflecting mirror 50 with respect to the discharge lamp 90, an arbitrary method can be adopted besides the method of fixing the main reflecting mirror 112 and the sub-reflecting mirror 50 to the discharge lamp 90. For example, it is also possible to fix the discharge lamp 90 and the main reflecting mirror 112 independently to a housing (not shown) of the projector. The same can be applied to the sub-reflecting mirror 50.

2. Discharge Lamp Lighting Device

2-1. Configuration of Discharge Lamp Lighting Device

Figure 3:
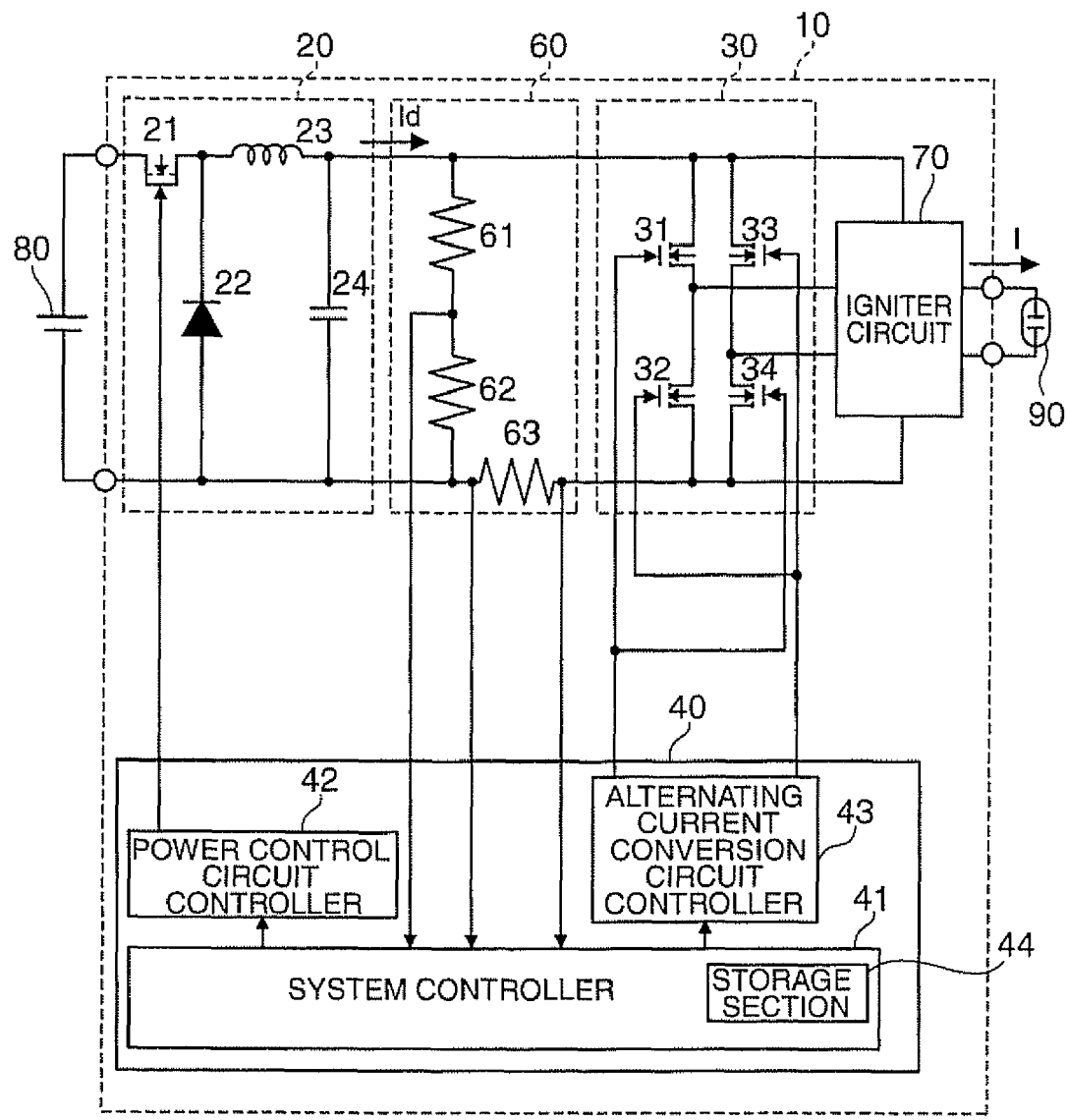
FIG. 3 is a circuit diagram of a discharge lamp lighting device according to the present embodiment.

FIG. 3 is an example of a circuit diagram of the discharge lamp lighting device according to the present embodiment.

The discharge lamp lighting device 10 includes a power control circuit 20. The power control circuit 20 generates drive power to be supplied to the discharge lamp 90. In the present embodiment, the power control circuit 20 is formed of a down-chopper circuit receiving an input from a direct current power supply 80, and stepping down the input voltage to output a direct current Id.

The power control circuit 20 can be configured including a switch element 21, a diode 22, a coil 23, and a capacitor 24. The switch element 21 can be formed of, for example, a transistor. In the present embodiment, one end of the switch element 21 is connected to a positive voltage side of the direct current power supply 80, and the other end thereof is connected to a cathode terminal of the diode 22 and one end of the coil 23. Further, one end of the capacitor 24 is connected to the other end of the coil 23, and the other end of the capacitor 24 is connected to an anode terminal of the diode 22 and a negative voltage side of the direct current power supply 80. A current control signal is input to a control terminal of the switch element 21 from a control section 40 to execute ON/OFF control of the switch element 21. As the current control signal, a pulse width modulation (PWM) control signal can be used, for example.

Here, when the switch element 21 is switched ON, a current flows through the coil 23, and energy is stored in the coil 23. Subsequently, when the switch element 21 is switched OFF, the energy stored in the coil 23 is released along the path passing through the capacitor 24 and the diode 22. As a result, the direct current Id according to a proportion of the ON time of the switch element 21 is generated.

The discharge lamp lighting device 10 includes an alternating current conversion circuit 30. The alternating current conversion circuit 30 inputs the direct current Id output from the power control circuit 20 and reverses the polarity of the input with predetermined timing, thereby generating and outputting a drive current for driving the discharge lamp with a desired frequency. In the present embodiment, the alternating current conversion circuit 30 is formed of an inverter bridge circuit (a full bridge circuit).

The alternating conversion circuit 30 is configured including first through fourth switch elements 31 through 34 such as transistors, wherein the first and second switch elements 31, 32 connected in series with each other are connected in parallel to the third and fourth switch elements 33, 34 connected in series with each other. Frequency control signals are input respectively to control terminals of the first through fourth switch elements 31 through 34 from the control section 40 to control ON/OFF of the first through fourth switch elements 31 through 34.

The alternating current conversion circuit 30 repeats executing ON/OFF operation alternately on a pair composed of the first and fourth switch elements 31, 34 and a pair composed of the second and third switch elements 32, 33, thereby intermittently reversing the polarity of the direct current Id output from the power control circuit 20, and outputting the alternating current I for driving the discharge lamp with a controlled frequency thus generated from a common connection point of the first and second switch elements 31, 32 and a common connection point of the third and fourth switch elements 33, 34.

Specifically, the control section 40 performs control so that the second and third switch elements 32, 33 are set in the OFF state while the first and fourth switch elements 31, 34 are in the ON state, and that the second and third switch elements 32, 33 are set in the ON state while the first and fourth switch elements 31, 34 are in the OFF state. Therefore, while the first and fourth switch elements 31, 34 are in the ON state, there is generated the alternating current I for driving the discharge lamp flowing from one end of the capacitor 24 through the first switch element 31, the discharge lamp 90, and the fourth switch element 34 in this order. Further, while the second and third switch elements 32, 33 are in the ON state, there is generated the alternating current I for driving the discharge lamp flowing from the one end of the capacitor 24 through the third switch element 33, the discharge lamp 90, and the second switch element 32 in this order.

The discharge lamp lighting device 10 includes the control section 40. The control section 40 controls the power control circuit 20 and the alternating current conversion circuit 30, thereby controlling the current value and the frequency of the alternating current I for driving the discharge lamp. The control section 40 executes the alternating current conversion control for controlling the frequency with polarity reversal timing of the alternating current I for driving the discharge lamp on the alternating current conversion circuit 30. Further, the control section 40 executes the current control on the power control circuit 20 for controlling the current value of the direct current Id output therefrom.

Although the configuration of the control section 40 is not particularly limited, the control section 40 is configured including a system controller 41, a power control circuit controller 42, and a alternating current conversion circuit controller 43 in the present embodiment. It should be noted that it is also possible to configure a part or whole of the control section 40 with a semiconductor integrated circuit.

The system controller 41 controls the power control circuit controller 42 and the alternating current conversion circuit controller 43, thereby controlling the power control circuit 20 and the alternating current conversion circuit 30. The system controller 41 can control the power control circuit controller 42 and the alternating current conversion circuit controller 43 based on the discharge lamp drive voltage and the alternating current I for driving the discharge lamp detected by an operation detection section 60 disposed inside the discharge lamp lighting device 10 described later.

In the present embodiment, the system controller 41 is configured including a storage section 44. It should be noted that the storage section 44 can be provided independently of the system controller 41.

The system controller 41 can control the power control circuit 20 and the alternating current conversion circuit 30 based on the information stored in the storage section 44. The storage section 44 can store the information related to, for example, the current value and the frequency of the alternating current I for driving the discharge lamp.

The power control circuit controller 42 outputs the current control signal to the power control circuit 20 based on the control signal from the system controller 41, thereby controlling the power control circuit 20.

The alternating current conversion circuit controller 43 outputs the alternating current conversion control signal to the alternating current conversion circuit 30 based on the control signal from the system controller 41, thereby controlling the alternating current conversion circuit 30.

The discharge lamp lighting device 10 can include the operation detection section 60. The operation detection section 60 can include, for example, a voltage detection section for detecting the discharge lamp drive voltage Vd of the discharge lamp 90 to output the drive voltage information, and a current detection section for detecting the alternating current I for driving the discharge lamp to output the drive current information. In the present embodiment, the operation detection section 60 is configured including first through third resistors 61 through 63.

In the present embodiment, the voltage detection section detects the discharge lamp drive voltage based on the voltage divided by the first and second resistors 61, 62 connected in series to each other and connected in parallel to the discharge lamp 90. Further, in the present embodiment, the current detection section detects the alternating current I for driving the discharge lamp based on the voltage generated in the third resistor 63 connected in series to the discharge lamp 90.

The discharge lamp lighting device 10 can include an igniter circuit 70. The igniter circuit 70 operates only when the lighting of the discharge lamp 90 is started, and supplies a high voltage (a voltage higher than in the normal control operation) between the electrodes of the discharge lamp 90, which is necessary for causing breakdown between the electrodes of the discharge lamp 90 to form a discharge path at the beginning of the lighting of the discharge lamp 90. In the present embodiment, the igniter circuit 70 is connected in parallel to the discharge lamp 90.

FIGS. 4A through 4D are explanatory diagrams showing a relationship between the polarity of the drive power supplied to a discharge lamp 90 and the temperature of the electrodes. FIGS. 4A and 4B show operational states of the two electrodes 92, 93. In the drawings, there are shown the tips of the two electrodes 92, 93. On the tips of the electrodes 92, 93, there are disposed projections 552p, 562p, respectively. The discharge occurs between these projections 552p, 562p. In the present embodiment, migration of the discharge position (the arc position) in each of the electrodes 92, 93 can be suppressed. It should be noted that such projections can be eliminated.

FIG. 4A shows a first polarity state P1 in which the first electrode 92 acts as an anode, and the second electrode 93 acts as a cathode. In the first polarity state P1, electrons are transferred from the second electrode 93 (the cathode) to the first electrode 92 (the anode) in accordance with the discharge. The electrons are emitted from the cathode (the second electrode 93). The electrons emitted from the cathode (the second electrode 93) collide with the tip of the anode (the first electrode 92). The collision causes heat, and the temperature of the tip (the projection 552p) of the anode (the first electrode 92) rises.

FIG. 4B shows a second polarity state P2 in which the first electrode 92 acts as a cathode, and the second electrode 93 acts as an anode. In the second polarity state P2, in contrast to the first polarity state P1, electrons are transferred from the first electrode 92 to the second electrode 93. As a result, the temperature of the tip (the projection 562p) of the second electrode 93 rises.

As described above, the temperature of the anode is apt to become higher than that of the cathode. Here, if the state in which the temperature of one electrode is higher than that of the other electrode continues, various problems may be caused. For example, if the tip of the high-temperature electrode is excessively melted, unintended electrode deformation is caused. As a result, the arc length may be shifted from an appropriate value. Further, if the meltage of the tip of the low-temperature electrode is insufficient, minute unevenness caused on the tip may remain unmelted. As a result, so-called arc jump may be caused (the arc position may not be stabilized but migrated).

As a technology for suppressing such problems, the alternating current drive for repeatedly exchanging the polarities of the electrodes can be utilized. FIG. 4C is a timing chart showing the alternating current (the drive signal) supplied to the discharge lamp 90 (FIG. 2). The lateral axis represents time T, and the vertical axis represents the current value of the alternating current I. The alternating current I denotes the current flowing through the discharge lamp 90. The positive value represents the first polarity state P1, and the negative value represents the second polarity state P2. In the example shown in FIG. 4C, there is used a rectangular-wave alternating current. Further, the first polarity state P1 and the second polarity state P2 are repeated alternately. Here, a first polarity period Tp represents a time period in which the first polarity state P1 lasts, and a second polarity period Tn represents a time period in which the second polarity state P2 lasts. Further, an average current value in the first polarity period Tp is Im1, and an average current value in the second polarity period Tn is −Im2. It should be noted that the drive frequency can be determined from experiment in accordance with the characteristic of the discharge lamp 90 (e.g., a value in a range of 30 Hz through 1 kHz is adopted). The other values Im1, −Im2, Tp, and Tn can also be determined from experiment.

FIG. 4D is a timing chart showing a temperature variation of the first electrode 92. The lateral axis represents time T, and the vertical axis represents the temperature H. The temperature H of the first electrode 92 rises in the first polarity state P1, and the temperature H of the first electrode 92 drops in the second polarity state P2. Further, since the first polarity state P1 and the second polarity state P2 are repeated alternately, the temperature H varies periodically between the minimum value Hmin and the maximum value Hmax. It should be noted that although not shown in the drawing, the temperature of the second electrode 93 varies in opposite phase with the temperature H of the first electrode 92. In other words, the temperature of the second electrode 93 drops in the first polarity state P1, and the temperature of the second electrode 93 rises in the second polarity state P2.

In the first polarity state P1, since the tip of the first electrode 92 (the projection 552p) is melted, the tip of the first electrode 92 (the projection 552p) is smoothed. Thus, the migration of the discharge position in the first electrode 92 can be suppressed. Further, since the temperature of the tip of the second electrode 93 (the projection 562p) drops, the excessive meltage of the second electrode 93 (the projection 562p) can be suppressed. Thus, unintended electrode deformation can be suppressed. In the second polarity state P2, the situations of the first electrode 92 and the second electrode 93 are reversed. Therefore, by repeating the two states P1, P2 alternately, the problems in each of the two electrodes 92, 93 can be suppressed.

Here, in the case in which the waveform of the current I is symmetric, in other words, in the case in which the waveform of the current I satisfies the conditions "|Im1|=|−Im2|, Tp=Tn," the conditions of the supplied power are the same between the two electrodes 92, 93. Therefore, it is presumed that the temperature difference between the two electrodes 92, 93 becomes small. However, if the drive with such a symmetrical current waveform is continuously maintained, there is a possibility that stationary convection occurs inside the discharge space 91 to cause deposition or segregation of the electrode material at a localized area of the axis of the electrode, and to make the electrode material grow to form a needle shape, which causes unintended discharge toward the wall surface made of a translucent material surrounding the discharge space 91. Such unintended discharge causes the inside wall to be deteriorated and the life of the discharge lamp 90 to be shortened. Further, if the drive with such a symmetrical current waveform is continuously maintained, since a stationary temperature distribution of the electrode is maintained for a long period of time, the asymmetry property caused in accordance with a temporal state variation becomes more and more encouraged with time.

2-2. Control Example of Discharge Lamp Lighting Device

Then, a specific example of control of the discharge lamp lighting device 10 according to the present embodiment will be explained.

The control section 40 of the discharge lamp lighting device 10 according to the present embodiment executes a steady drive process for executing the alternating current conversion control with a given frequency, a first low frequency drive process for executing the alternating current conversion control with a first low frequency driving frequency lower than the given frequency and starting from a first polarity and ending with the first polarity, and a second low frequency drive process for executing the alternating current conversion control with a second low frequency driving frequency lower than the given frequency and starting from a second polarity and ending with the second polarity.

In the first low frequency drive process, the control section 40 performs control so that the alternating current I for driving the discharge lamp starts from the first polarity and ends with the first polarity. Therefore, the temperature of the first electrode 92 rises, and the temperature of the second electrode 93 drops.

In the second low frequency drive process, the control section 40 performs control so that the alternating current I for driving the discharge lamp starts from the second polarity and ends with the second polarity. Therefore, the temperature of the second electrode 93 rises, and the temperature of the first electrode 92 drops.

FIGS. 5A through 5F are graphs showing a relationship between the alternating current I for driving the discharge lamp and the temperature for explaining an example of the control of the discharge lamp lighting device 10 according to the present embodiment. FIG. 5A is a graph showing a variation of the alternating current I for driving the discharge lamp in the steady drive process, FIG. 5B is a graph showing a variation of the temperature of the first electrode 92 in the steady drive process, FIG. 5C is a graph showing a variation of the alternating current I for driving the discharge lamp in the case of inserting the first low frequency drive process in the steady drive process, FIG. 5D is a graph showing a variation of the temperature of the first electrode 92 in the case of inserting the first low frequency drive process in the steady drive process, FIG. 5E is a graph showing a variation of the alternating current I for driving the discharge lamp in the case of inserting the second low frequency drive process in the steady drive process, and FIG. 5F is a graph showing a variation of the temperature of the first electrode 92 in the case of inserting the second low frequency drive process in the steady drive process. Further, in FIGS. 5A, 5C, and 5E, it is assumed that the direction of the current flowing in the case in which the first electrode 92 acts as the anode is positive.

In the case in which the first electrode 92 acts as the anode, the temperature of the first electrode 92 rises. Further, in the case in which the first electrode 92 acts as the cathode, the temperature of the first electrode 92 drops. In the steady drive process shown in FIG. 5A, the temperature of the first electrode 92 repeats rising and falling centering around an average temperature H0 as shown in FIG. 5B.

In the first low frequency drive process shown in FIG. 5C, the control section 40 performs control during 3/2 cycle so that the alternating current I for driving the discharge lamp starts from the first polarity and ends with the first polarity. In this case, since the time period when the first electrode 92 acts as the anode is longer than the time period when it acts as the cathode, the average temperature thereof becomes Hp higher than H0 as shown in FIG. 5D.

In the second low frequency drive process shown in FIG. 5E, the control section 40 performs control during 3/2 cycle so that the alternating current I for driving the discharge lamp starts from the second polarity and ends with the second polarity. In this case, since the time period when the first electrode 92 acts as the cathode is longer than the time period when it acts as the anode, the average temperature thereof becomes Hn lower than H0 as shown in FIG. 5F.

It should be noted that the period when the first low frequency drive process or the second low frequency drive process is executed is not limited to 3/2 cycle, but can be an odd multiple of 1/2 cycle such as 5/2 cycle or 7/2 cycle.

As described above, since the temperature difference (e.g., several tens through several hundreds of degrees) is generated between the both electrodes of the discharge lamp by executing the first low frequency drive process and the second low frequency drive process, it becomes possible to suppress the formation of the stationary convection inside the discharge lamp, and to prevent uneven consumption of the electrodes and uneven precipitation of the electrode material.

Further, in the present embodiment, it is possible that the control section 40 executes the alternating current conversion control for alternately repeating a first low frequency wave insertion period (a first period) and a second low frequency wave insertion period (a second period), executes a process of inserting the first low frequency drive processing period, in which the first low frequency drive process is executed, two or more times in the period of executing the steady drive process in the first low frequency wave insertion period, and executes a process of inserting the second low frequency drive processing period, in which the second low frequency drive process is executed, two or more times in the period of executing the steady drive process in the second low frequency wave insertion period.

FIGS. 6A and 6B are diagrams for explaining the first low frequency wave insertion period (period 1) and the second low frequency wave insertion period (period 2). In the first low frequency wave insertion period shown in FIG. 6A, the first low frequency drive processing period for executing the first low frequency drive process is inserted two or more times (three times in the example shown in FIG. 6A) in the period (the steady drive processing period) for executing the stationary drive process. In the second low frequency wave insertion period shown in FIG. 6B, the second low frequency drive processing period for executing the second low frequency drive process is inserted two or more times (three times in the example shown in FIG. 6B) in the period (the steady drive processing period) for executing the stationary drive process.

It should be noted that the number of times of inserting the first low frequency drive processing period in the first low frequency wave insertion period and the number of times of inserting the second low frequency drive processing period in the second low frequency wave insertion period are not limited to three times, but it is possible to insert these periods an arbitrary number of times no fewer than two times.

Figure 7:
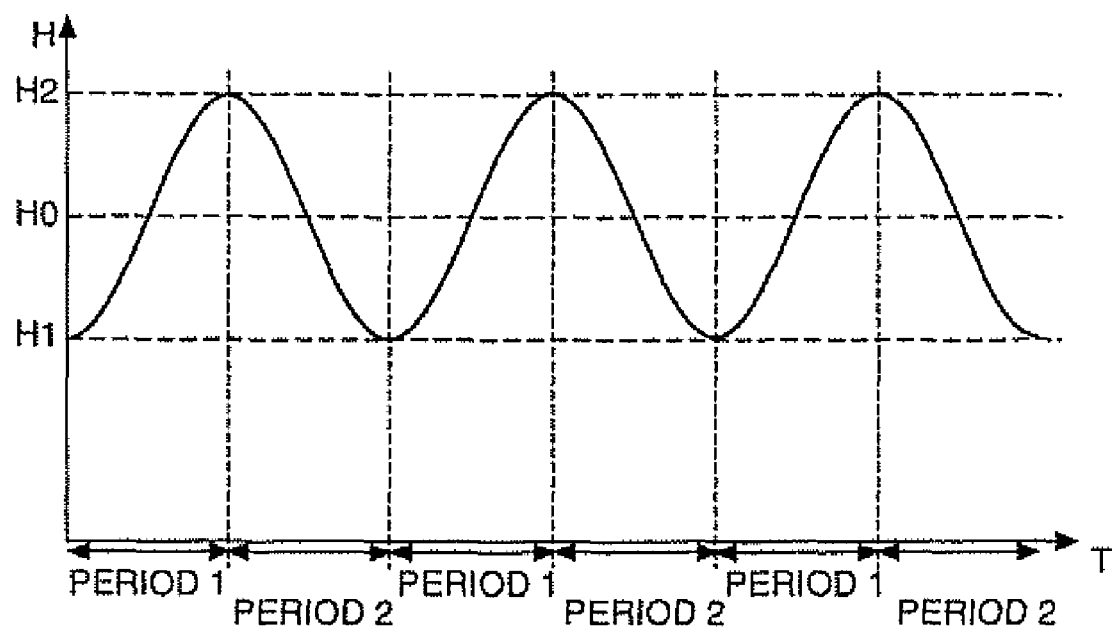
FIG. 7 is a graph representing a temperature variation of the first electrode 92 in the case in which a control section 40 executes alternating current conversion control for alternately repeating the first low frequency wave insertion period (period 1) and the second low frequency wave insertion period (period 2).

FIG. 7 is a graph representing a temperature variation of the first electrode 92 in the case in which the control section 40 executes alternating current conversion control for alternately repeating the first low frequency wave insertion period (period 1) and the second low frequency wave insertion period (period 2). It should be noted that in the graph shown in FIG. 7, in order for showing an overall picture of the temperature variation of the first electrode 92, there is shown a smooth curve approximating the variation of the average temperature obtained by averaging the temperature of the first electrode 92 every time the first low frequency drive process or the second low frequency drive process is executed once. In practice, since the steady drive processing period is provided before and after the first low frequency drive processing period and the second low frequency drive processing period, a temperature variation smaller than the variation width of H1 to H2 is also caused in addition to the major temperature variation between H1 and H2.

In the first low frequency wave insertion period (period 1), since the first low frequency drive processing period is inserted three times, the average temperature of the first electrode 92 rises. In FIG. 7 the highest average temperature of the first electrode 92 is H2.

In the second low frequency wave insertion period (period 2), since the second low frequency drive processing period is inserted three times, the average temperature of the first electrode 92 drops. In FIG. 7 the lowest average temperature of the first electrode 92 is H1.

As described above, by alternately repeating the first low frequency wave insertion period (period 1) and the second low frequency wave insertion period (period 2) it becomes possible to vary the average temperature of the electrode in the range from H1 to H2. Therefore, it is possible to suppress the formation of the stationary convection inside the discharge lamp, thereby preventing the uneven consumption of the electrode and the uneven precipitation of the electrode material.

First Modified Example

Although an example of controlling the highest average temperature H2 and the lowest average temperature H1 to be constant is explained in the embodiment described above, it is also possible to execute the control while varying the highest average temperature H2 or the lowest average temperature H1.

The control section 40 can vary the highest average temperature H2 by varying the interval of insertion of the first low frequency drive processing period inserted in one first low frequency wave insertion period (period 1). Similarly, the control section 40 can vary the lowest average temperature H1 by varying the interval of insertion of the second low frequency drive processing period inserted in one second low frequency wave insertion period. According to such control, it becomes possible to vary the electrode temperature in a desired range.

Further, the control section 40 can vary the highest average temperature H2 by varying the number of cycles included in one first low frequency drive processing period. Similarly, the control section 40 can vary the lowest average temperature H1 by varying the number of cycles included in one second low frequency drive processing period. According to such control, it becomes possible to vary the electrode temperature in a desired range.

Further, the control section 40 can vary the highest average temperature H2 by varying the first low frequency driving frequency. Similarly, the control section 40 can vary the lowest average temperature H1 by varying the second low frequency driving frequency. According to such control, it becomes possible to vary the electrode temperature in a desired range.

It should be noted that the control of the interval of the insertion of the low frequency drive processing period, the number of cycles included in the low frequency drive processing period, and the low frequency driving frequency can be performed by the control section 40 outputting the alternating current conversion control signal to the alternating current conversion circuit 30 to control the polarity reversal timing.

Figure 8A:
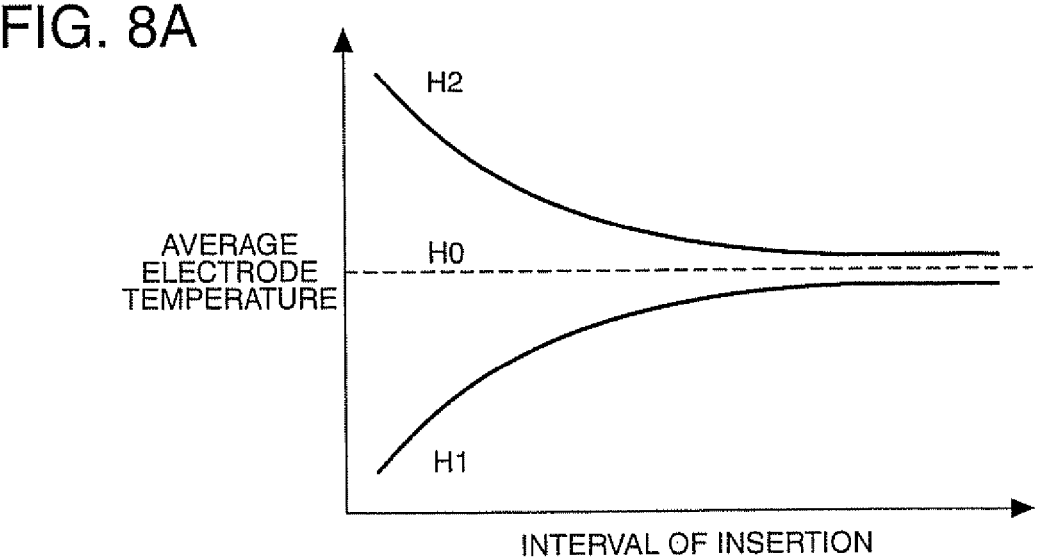
FIGS. 8A through 8C are graphs respectively showing a relationship between an interval of insertion of a low frequency drive processing period and an average electrode temperature, a relationship between the number of cycles included in the low frequency drive processing period and the average electrode temperature, and a relationship between the low frequency driving frequency and the average electrode temperature.
Figure 8B:
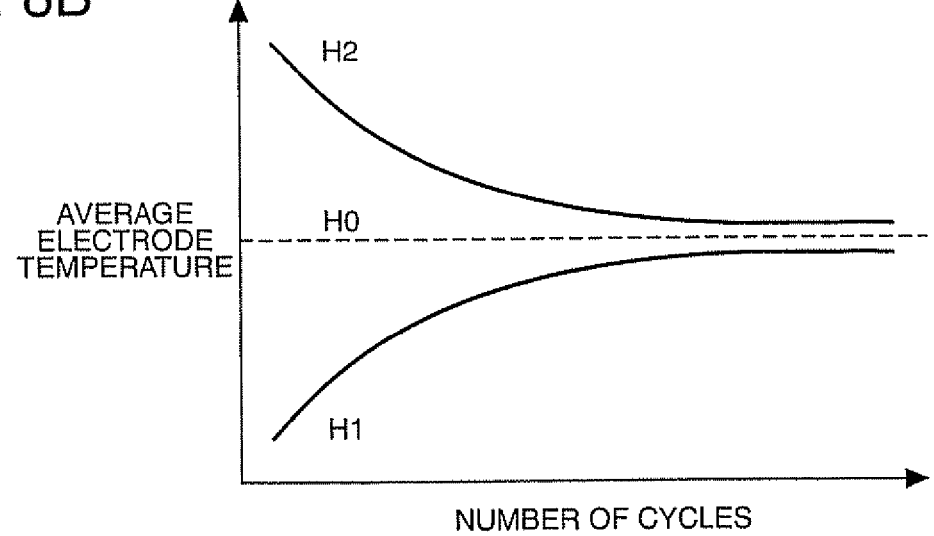
Figure 8C:
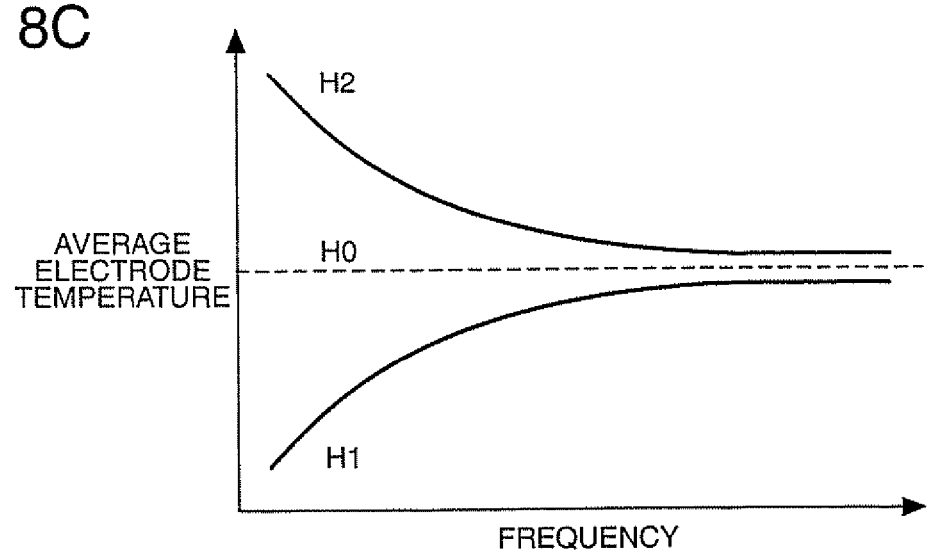

FIGS. 8A through 8C are graphs respectively showing a relationship between the interval of the insertion of the low frequency drive processing period and the average electrode temperature, a relationship between the number of cycles included in the low frequency drive processing period and the average electrode temperature, and a relationship between the low frequency driving frequency and the average electrode temperature. The lateral axis in FIG. 8A represents the interval of the insertion of the low frequency drive processing period, the lateral axis in FIG. 8B represents the number of cycles included in the low frequency drive processing period, the lateral axis in FIG. 8C represents the low frequency driving frequency, and the vertical axis in FIGS. 8A through 8C represents the average temperature of the first electrode 92.

As shown in FIG. 8A, the shorter the interval of the insertion of the first low frequency drive processing period inserted in one first low frequency wave insertion period is set, the higher the average highest temperature H2 of the first electrode 92 becomes. Further, the shorter the interval of the insertion of the second low frequency drive processing period inserted in one second low frequency wave insertion period is set, the lower the average lowest temperature H1 of the first electrode 92 becomes.

As shown in FIG. 8B, the smaller the number of cycles included in one first low frequency drive processing period is set, the higher the highest average temperature H2 of the first electrode 92 becomes. Further, the smaller the number of cycles included in one second low frequency drive processing period is set, the lower the lowest average temperature H1 of the first electrode 92 becomes. The smaller the number of cycles included in the low frequency drive processing period is, the larger the proportion of the difference between the period of time when the first electrode 92 is set to be the anode and the period of time when it is set to be the cathode with respect to the length of the low frequency drive processing period becomes, and the larger each of the difference between the highest average temperature H2 and the average temperature H0 and the difference between the lowest average temperature H1 and the average temperature H0 becomes.

As shown in FIG. 8C, the lower the first low frequency driving frequency is set, the higher the highest average temperature H2 of the first electrode 92 becomes. Further, the lower the second low frequency driving frequency is set, the lower the lowest average temperature H1 of the first electrode 92 becomes.

As described above, by varying the interval of the insertion of the low frequency drive processing period, the number of cycles included in the low frequency drive processing period, and the low frequency driving frequency, it is possible to arbitrarily vary the highest average temperature H2 and the lowest average temperature H1.

Figure 9:
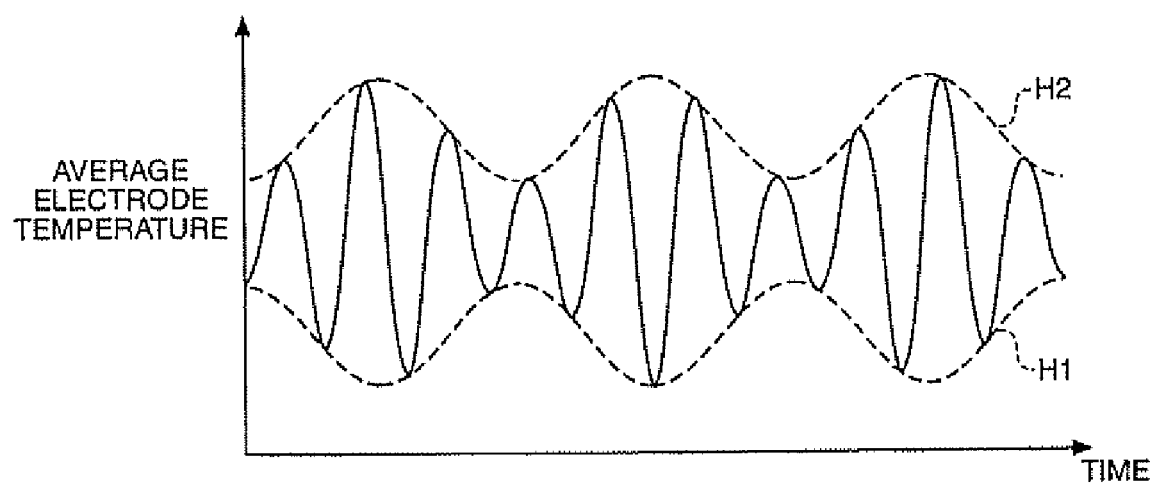
FIG. 9 is a graph showing an example of a variation in the average electrode temperature in the case of varying the highest average temperature H2 and the lowest average temperature H1.

FIG. 9 is a graph showing an example of a variation in the average electrode temperature in the case of varying the highest average temperature H2 and the lowest average temperature H1. The lateral axis represents time, and the vertical axis represents the average electrode temperature of the first electrode 92, and the variation thereof is illustrated with a solid line. Further, the variations of the highest average temperature H2 and the lowest average temperature H1 are respectively illustrated with broken lines. It should be noted that in the graph of FIG. 9, smooth curves approximating the variation of the average electrode temperature are illustrated. In practice, since the steady drive processing period is provided before and after the low frequency drive processing period, a temperature variation smaller than the variation width of H1 to H2 is also caused in addition to the major temperature variation between H1 and H2.

It should be noted that although in the example shown in FIG. 9 both of the highest average temperature H2 and the lowest average temperature H1 are varied, it is also possible to vary either one of the highest average temperature H2 and the lowest average temperature H1.

As described above, by varying the average temperature of the electrode while varying the highest average temperature H2 and the lowest average temperature H1 of the electrode, it is possible to suppress the formation of the stationary convection inside the discharge lamp, thereby preventing the uneven consumption of the electrode and the uneven precipitation of the electrode material.

Second Modified Example

The discharge lamp 90 explained with reference to FIG. 2 includes the first electrode 92 acting as the anode in the first polarity and the second electrode 93 acting as the anode in the second polarity, and is provided with the main reflecting mirror 112 disposed on the first electrode 92 side and adapted to reflect the light beam generated by the discharge between the first electrode 92 and the second electrode 93 to emit the light beam to the illuminated area, and the sub-reflecting mirror 50 disposed on the second electrode 93 side so as to be opposed to the main reflecting mirror 112 and adapted to reflect the light beam from the inter-electrode space between the first electrode 92 and the second electrode 93 toward the inter-electrode space side.

In the discharge lamp 90 having such a configuration, since the sub-reflecting mirror 50 hinders heat radiation of the second electrode 93, the temperature of the second electrode 93 closer to the sub-reflecting mirror 50 is apt to be higher than that of the first electrode 92.

If the difference in electrode temperature lasts for a long period of time, there is a possibility of causing a problem such as a difference in condition of consumption between the electrodes. Therefore, in such a case, by performing asymmetrical control between the first low frequency wave insertion period (period 1) and the second low frequency wave insertion period (period 2), it is possible to compensate the effect of the temperature due to the sub-reflecting mirror 50.

For example, the control section 40 executes the alternating current conversion control of setting the interval of the insertion of the second low frequency drive processing period inserted in the second low frequency wave insertion period (period 2) to be longer than the interval of the insertion of the first low frequency drive processing period inserted in the first low frequency wave insertion period (period 1), thereby making it possible to suppress the temperature rise in the second electrode 93 in the second low frequency wave insertion period.

Further, for example, the control section 40 executes the alternating current conversion control of making the number of cycles included in the second low frequency drive processing period larger than the number of cycles included in the first low frequency drive processing period, thereby making it possible to suppress the temperature rise in the second electrode 93 in the second low frequency wave insertion period.

Further, for example, the control section 40 executes the alternating current conversion control of making the second low frequency driving frequency higher than the first low frequency driving frequency, thereby making it possible to suppress the temperature rise in the second electrode 93 in the second low frequency wave insertion period.

Third Modified Example

Although in the embodiment described above, the explanations are presented using the example of executing the alternating current conversion control in the first low frequency drive processing period and the second low frequency drive processing period while making the first low frequency driving frequency and the second low frequency driving frequency constant as shown in, for example, FIGS. 5C and 5E, in the first low frequency drive processing period and the second low frequency drive processing period the control section 40 can also execute the alternating current conversion control of setting the length of time of at least one of the first 1/2 cycle and the last 1/2 cycle in each of those periods to be larger than the length of time of any other 1/2 cycle in that period.

Figure 10A:
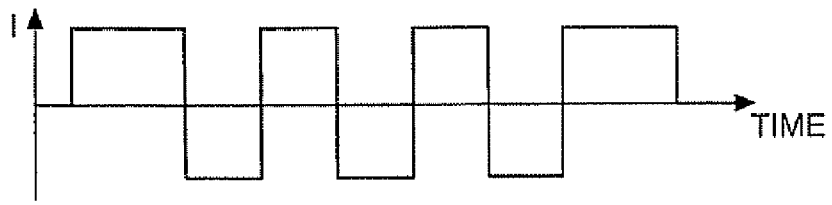
FIGS. 10A through 10F are graphs showing examples of a waveform of an alternating current I for driving a discharge lamp in a first low frequency drive processing period and a second low frequency drive processing period.
Figure 10B:
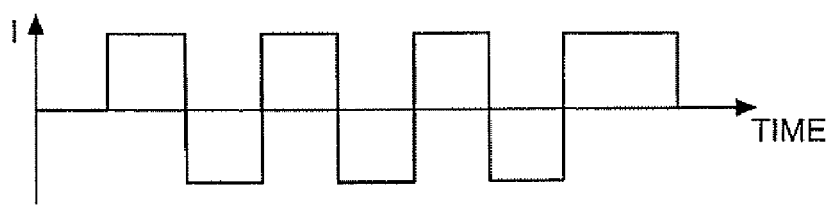
Figure 10C:
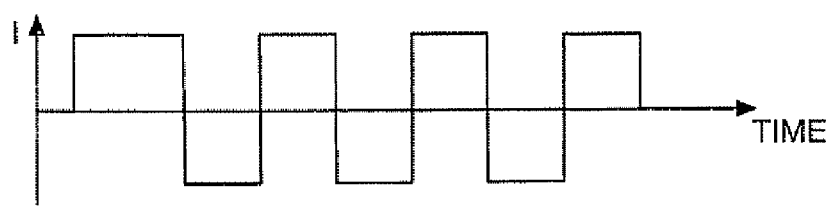
Figure 10D:
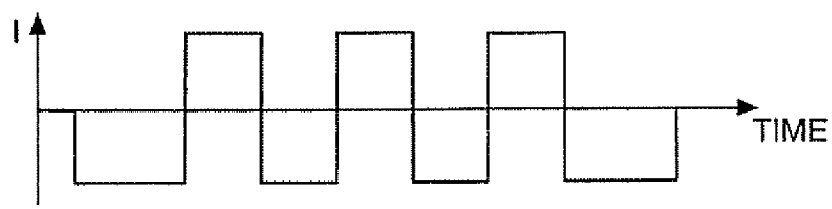
Figure 10E:
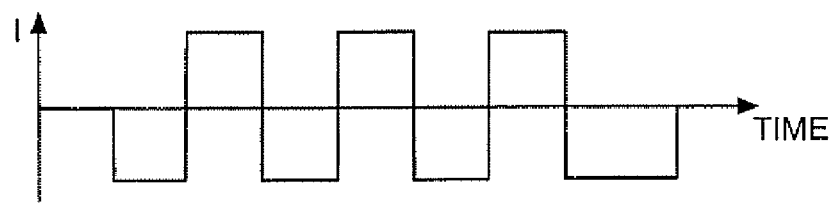
Figure 10F:
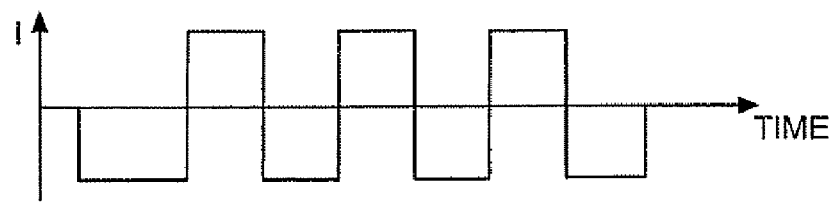

FIGS. 10A through 10F are graphs showing examples of a waveform of the alternating current I for driving the discharge lamp in the first low frequency drive processing period and the second low frequency drive processing period. FIGS. 10A through 10C show examples of the waveform of the alternating current I for driving the discharge lamp in the first low frequency drive processing period, and FIGS. 10D through 10F show examples of the waveform of the alternating current I for driving the discharge lamp in the second low frequency drive processing period. Further, in all of the exemplified cases, the number of cycles included in each of the first low frequency drive processing period and the second low frequency drive processing period is 7/2 cycle.

As shown in FIG. 10A, the control section 40 can also execute the alternating current conversion control of setting the length of time of the first and last 1/2 cycle in the first low frequency drive processing period to be larger than the length of time of any other 1/2 cycle in the first low frequency drive processing period. As shown in FIG. 10B, the control section 40 can also execute the alternating current conversion control of setting the length of time of the last 1/2 cycle in the first low frequency drive processing period to be larger than the length of time of any other 1/2 cycle in the first low frequency drive processing period. As shown in FIG. 10C, the control section 40 can also execute the alternating current conversion control of setting the length of time of the first 1/2 cycle in the first low frequency drive processing period to be larger than the length of time of any other 1/2 cycle in the first low frequency drive processing period.

As shown in FIG. 10D, the control section 40 can also execute the alternating current conversion control of setting the length of time of the first and last 1/2 cycle in the second low frequency drive processing period to be larger than the length of time of any other 1/2 cycle in the second low frequency drive processing period. As shown in FIG. 10E, the control section 40 can also execute the alternating current conversion control of setting the length of time of the last 1/2 cycle in the second low frequency drive processing period to be larger than the length of time of any other 1/2 cycle in the second low frequency drive processing period. As shown in FIG. 10F, the control section 40 can also execute the alternating current conversion control of setting the length of time of the first 1/2 cycle in the second low frequency drive processing period to be larger than the length of time of any other 1/2 cycle in the second low frequency drive processing period.

In the first low frequency drive processing period and the second low frequency drive processing period, the first 1/2 cycle and last 1/2 cycle have significant effects on the average temperature of the electrode compared to any other period in those periods. Therefore, since the period in which one electrode is positive becomes longer than the period in which the other electrode is positive by setting the length of time of at least one of the first and last 1/2 cycle in each of those periods to be larger, the average temperature of the electrode can more significantly be varied.

Fourth Modified Example

Although in the embodiment described above the explanations are presented using the example in which the control section 40 executes, on the power control circuit 20, current control for controlling the current value of the direct current Id, which is output by the power control circuit 20, to be constant as shown in, for example, FIGS. 5C and 5E, the control section 40 can also execute the current control of setting the maximum current value of the direct current Id in at least one of the first 1/2 cycle and the last 1/2 cycle in each of the first low frequency drive processing period and the second low frequency drive processing period to be larger than any other current value in the period.

Figure 11A:
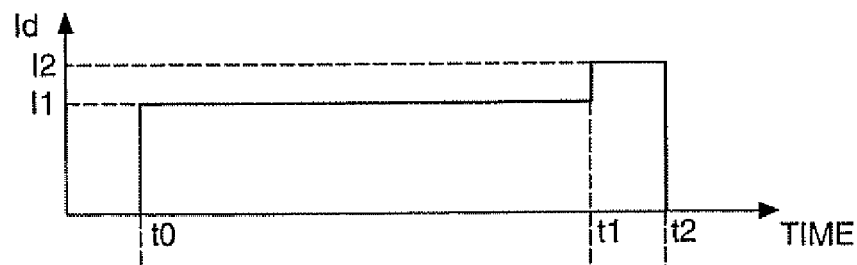
FIGS. 11A through 11C are graphs showing a relationship between a direct current Id and the alternating current I for driving the discharge lamp.
Figure 11B:
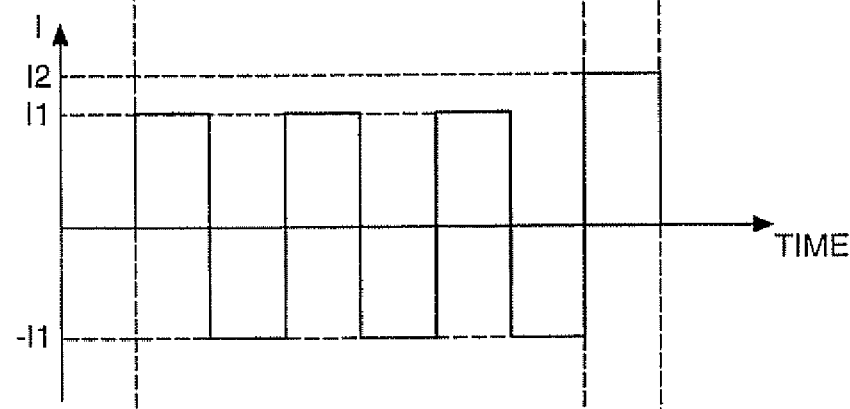
Figure 11C:
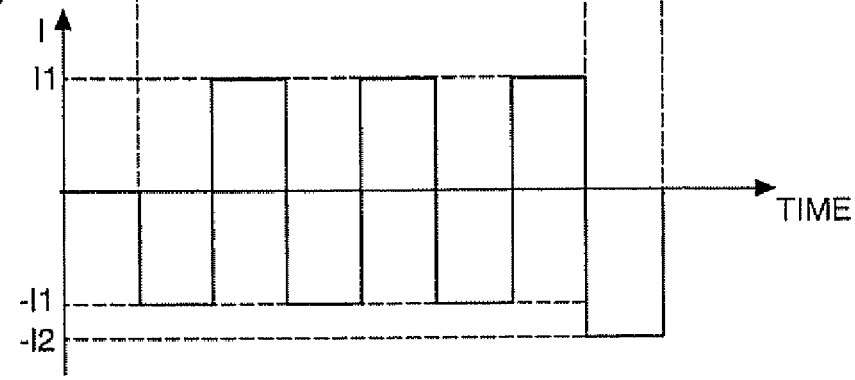

FIGS. 11A through 11C are graphs showing a relationship between the direct current Id and the alternating current I for driving the discharge lamp. FIG. 11A shows a variation of the direct current Id, FIG. 11B shows a variation of the alternating current I for driving the discharge lamp in the first low frequency drive processing period, and FIG. 11C shows a variation of the alternating current I for driving the discharge lamp in the second low frequency drive processing period.

In the example shown in FIG. 11A, current control is executed on the direct current Id so as to have a current value of I1 from a time point t0 to a time point t1, and a current value of I2 from the time point t1 to a time point t2. It should be noted that the control of the current value of the direct current Id can be executed by outputting the current control signal from the control section 40 to the power control circuit 20.

In the first low frequency drive processing period, the alternating current I for driving the discharge lamp becomes an alternating current in a range from −I1 to I1 from the time point t0 to the time point t1, and becomes an alternating current in a range from −I1 to I2 from the time point t1 to the time point t2 as shown in FIG. 11B.

Similarly, in the second low frequency drive processing period, the alternating current I for driving the discharge lamp becomes an alternating current in a range from −I1 to I1 from the time point t0 to the time point t1, and becomes an alternating current in a range from −T2 to I1 from the time point t1 to the time point t2 as shown in FIG. 11C.

As described above, by controlling the direct current Id output by the power control circuit 20, the pulse height (absolute value) of the alternating current I for driving the discharge lamp can be controlled.

Figure 12A:
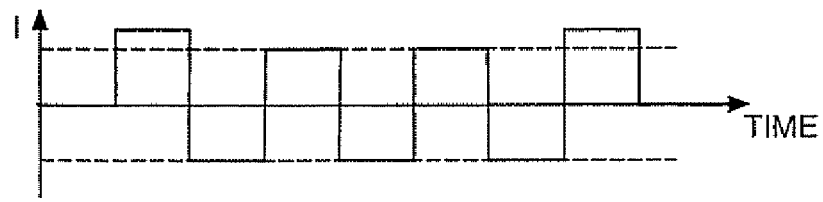
FIGS. 12A through 12F are graphs showing examples of a waveform of the alternating current I for driving the discharge lamp in the first low frequency drive processing period and the second low frequency drive processing period.
Figure 12B:
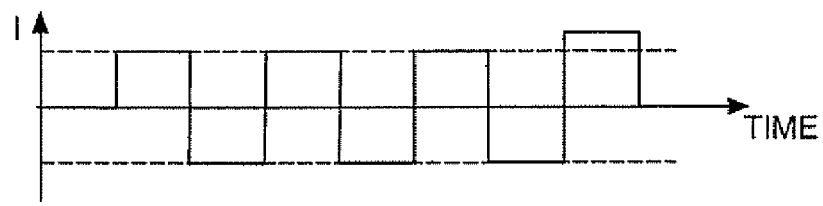
Figure 12C:
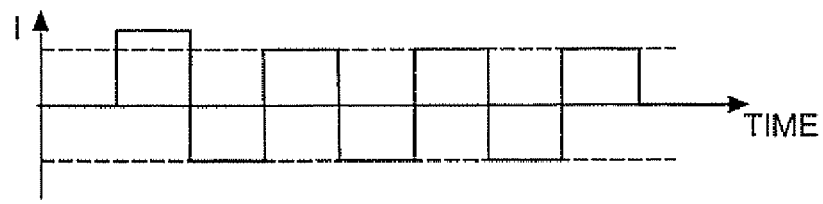
Figure 12D:
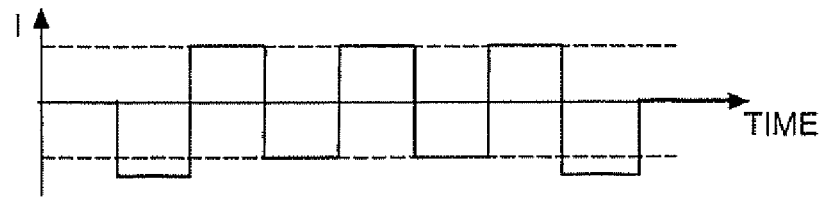
Figure 12E:
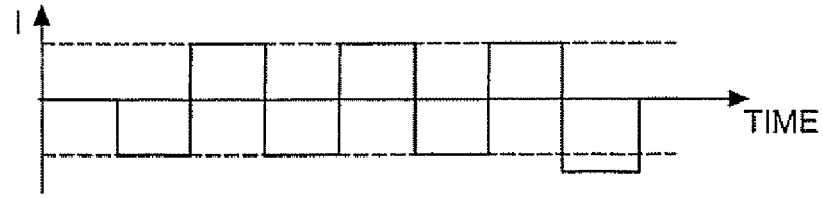
Figure 12F:
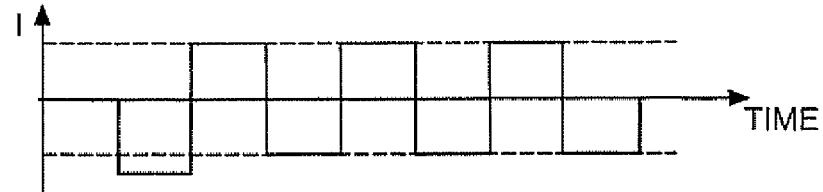

FIGS. 12A through 12F are graphs showing examples of the waveform of the alternating current I for driving the discharge lamp in the first low frequency drive processing period and the second low frequency drive processing period, FIGS. 12A through 12C show examples of the waveform of the alternating current I for driving the discharge lamp in the first low frequency drive processing period, and FIGS. 12D through 12F show examples of the waveform of the alternating current I for driving the discharge lamp in the second low frequency drive processing period. Further, in all of the exemplified cases, the number of cycles included in each of the first low frequency drive processing period and the second low frequency drive processing period is 7/2 cycle.

As shown in FIG. 12A, the control section 40 can also execute the current control of setting the maximum current value of the direct current Id in the first and last 1/2 cycle in the first low frequency drive processing period to be larger than any other current value in the first low frequency drive processing period. As shown in FIG. 12B, the control section 40 can also execute the current control of setting the maximum current value of the direct current Id in the last 1/2 cycle in the first low frequency drive processing period to be larger than any other current value in the first low frequency drive processing period. As shown in FIG. 12C, the control section 40 can also execute the current control of setting the maximum current value of the direct current Id in the first 1/2 cycle in the first low frequency drive processing period to be larger than any other current value in the first low frequency drive processing period.

As shown in FIG. 12D, the control section 40 can also execute the current control of setting the maximum current value of the direct current Id in the first and last 1/2 cycle in the second low frequency drive processing period to be larger than any other current value in the second low frequency drive processing period. As shown in FIG. 12E, the control section 40 can also execute the current control of setting the maximum current value of the direct current Id in the last 1/2 cycle in the second low frequency drive processing period to be larger than any other current value in the second low frequency drive processing period. As shown in FIG. 12F, the control section 40 can also execute the current control of setting the maximum current value of the direct current id in the first 1/2 cycle in the second low frequency drive processing period to be larger than any other current value in the second low frequency drive processing period.

In the first low frequency drive processing period and the second low frequency drive processing period, the first 1/2 cycle and last 1/2 cycle have significant effects on the average temperature of the electrode compared to any other period in those periods. Therefore, by setting the maximum current value at least one of the first and last 1/2 cycle in each of those periods to be larger, the average temperature of the electrode can more significantly be varied.

Fifth Modified Example

Although in the embodiment described above the explanations are presented using the example in which each of the interval of the insertion of the low frequency drive processing period, the number of cycles included in the low frequency drive processing period, and the low frequency driving frequency is fixed to one value, the control section 40 can also execute the alternating current conversion control of varying at least one of the interval of the insertion of the low frequency drive processing period, the number of cycles included in the low frequency drive processing period, and the low frequency driving frequency based on the electrode conditions detected by an electrode condition detection section (the operation detection section 60).

Hereinafter, an example of executing control based on the discharge lamp drive voltage Vd (corresponding to the electrode condition in the invention) detected by the operation detection section 60 (corresponding to the electrode condition detection section in the invention) will be explained.

FIG. 13 is a table showing an example of correspondence between the discharge lamp drive voltage Vd and each of the interval of insertion of the low frequency drive processing period, the number of cycles included in the low frequency drive processing period, and the low frequency driving frequency. In the example shown in FIG. 13, the control is performed so that the higher the discharge lamp drive voltage Vd becomes, the more significantly the average temperature of the electrode is varied.

In the case of controlling the interval of insertion of the low frequency drive processing period, the low frequency drive processing period is inserted every one second when the discharge lamp drive voltage Vd is equal to or higher than 100V, every two seconds when Vd is equal to or higher than 80V and lower than 100V, or every five seconds when Vd is equal to or higher than 60V and lower than 80V, or the low frequency drive processing period is not inserted when the discharge lamp drive voltage Vd is lower than 60V.

In the case of controlling the number of cycles included in the low frequency drive processing period, the low frequency drive processing period to be inserted corresponds to 3/2 cycle when the discharge lamp drive voltage Vd is equal to or higher than 100V, 7/2 cycle when Vd is equal to or higher than 80V and lower than 100V, or 13/2 cycle when Vd is equal to or higher than 60V and lower than 80V, or the low frequency drive processing period is not inserted when the discharge lamp drive voltage Vd is lower than 60V.

In the case of controlling the low frequency driving frequency, the low frequency drive processing period to be inserted has a frequency of 10 Hz when the discharge lamp drive voltage Vd is equal to or higher than 100V, 20 Hz when Vd is equal to or higher than 80V and lower than 100V, or 30 Hz when Vd is equal to or higher than 60V and lower than 80V, or the low frequency drive processing period is not inserted when the discharge lamp drive voltage Vd is lower than 60V.

Figure 14:
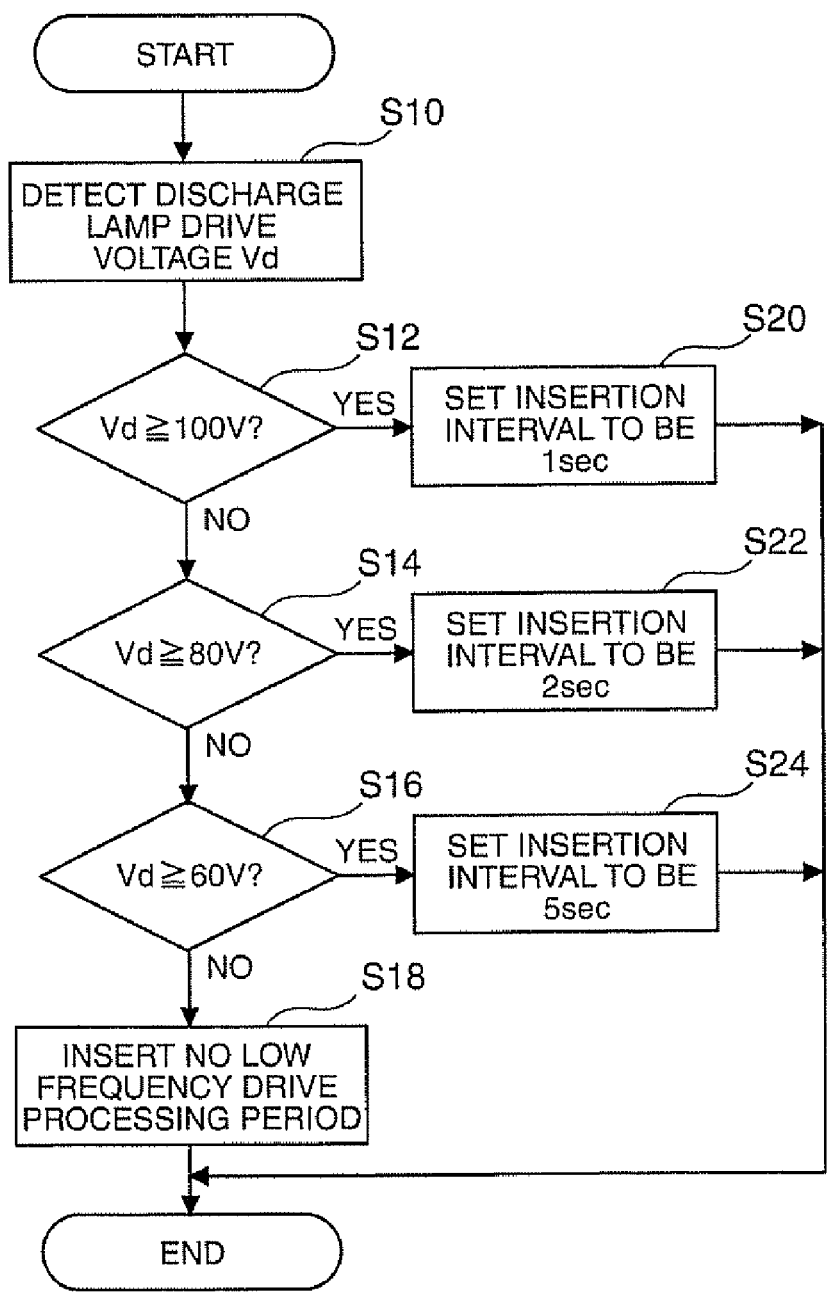
FIG. 14 is a flowchart of the case in which the interval of insertion of the low frequency drive processing period is varied in accordance with the discharge lamp drive voltage Vd.

FIG. 14 is a flowchart of the case in which the interval of insertion of the low frequency drive processing period is varied in accordance with the discharge lamp drive voltage Vd.

Firstly, the operation detection section 60 detects the discharge lamp drive voltage Vd (step S10). The control section 40 accepts the discharge lamp drive voltage Vd thus detected as the drive voltage information.

Subsequently, the control section 40 determines whether or not the discharge lamp drive voltage Vd is equal to or higher than 100V (step S12). If it is determined that the discharge lamp drive voltage Vd is equal to or higher than 100V, the control section 40 sets the interval of the insertion of the low frequency drive processing period to be one second (step S20). The setting of the interval of the insertion of the low frequency drive processing period is stored in, for example, the storage section 44.

If it is determined in the step S12 that the discharge lamp drive voltage Vd is lower than 100V, the control section 40 determines whether or not the discharge lamp drive voltage Vd is equal to or higher than 80V (step S14). If it is determined that the discharge lamp drive voltage Vd is equal to or higher than 80V, the control section 40 sets the interval of the insertion of the low frequency drive processing period to be two seconds (step S22).

If it is determined in the step S14 that the discharge lamp drive voltage Vd is lower than 80V, the control section 40 determines whether or not the discharge lamp drive voltage Vd is equal to or higher than 60V (step S16). If it is determined that the discharge lamp drive voltage Vd is equal to or higher than 60V, the control section 40 sets the interval of the insertion of the low frequency drive processing period to be five seconds (step S24).

If it is determined in the step S16 that the discharge lamp drive voltage Vd is lower than 60V, the control section 40 executes setting so as not to insert the low frequency drive processing period (step S18).

Figure 15:
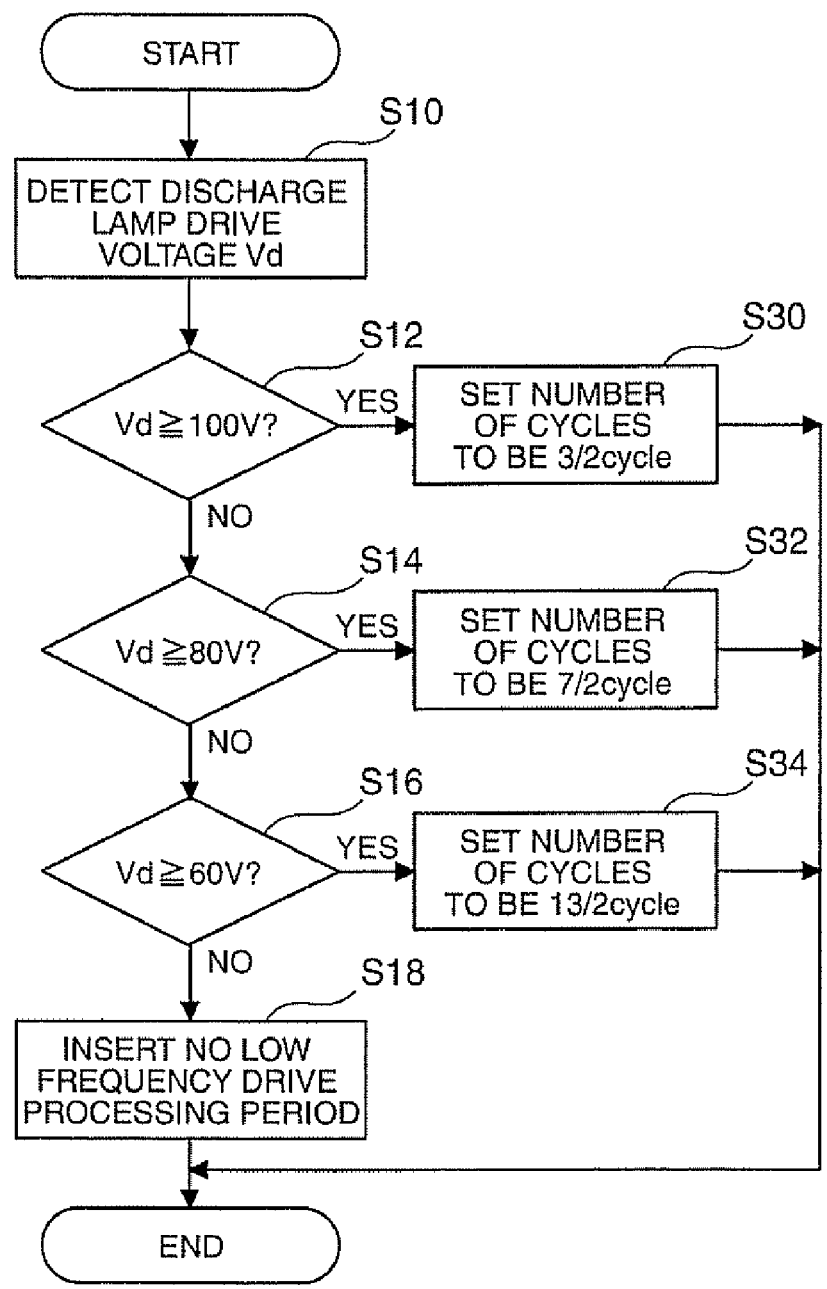
FIG. 15 is a flowchart of the case in which the number of cycles included in the low frequency drive processing period is varied in accordance with the discharge lamp drive voltage Vd.

FIG. 15 is a flowchart of the case in which the number of cycles included in the low frequency drive processing period is varied in accordance with the discharge lamp drive voltage Vd.

Firstly, the operation detection section 60 detects the discharge lamp drive voltage Vd (step S10). The control section 40 accepts the discharge lamp drive voltage Vd thus detected as the drive voltage information.

Subsequently, the control section 40 determines whether or not the discharge lamp drive voltage Vd is equal to or higher than 100V (step S12). If it is determined that the discharge lamp drive voltage Vd is equal to or higher than 100V, the control section 40 sets the number of cycles included in the low frequency drive processing period to be 3/2 cycle (step S30). The setting of the number of cycles included in the low frequency drive processing period is stored in, for example, the storage section 44.

If it is determined in the step S12 that the discharge lamp drive voltage Vd is lower than 100V, the control section 40 determines whether or not the discharge lamp drive voltage Vd is equal to or higher than 80V (step S14). If it is determined that the discharge lamp drive voltage Vd is equal to or higher than 80V, the control section 40 sets the number of cycles included in the low frequency drive processing period to be 7/2 cycle (step S32).

If it is determined in the step S14 that the discharge lamp drive voltage Vd is lower than 80V, the control section 40 determines whether or not the discharge lamp drive voltage Vd is equal to or higher than 60V (step S16). If it is determined that the discharge lamp drive voltage Vd is equal to or higher than 60V, the control section 40 sets the number of cycles included in the low frequency drive processing period to be 13/2 cycle (step S34).

If it is determined in the step S16 that the discharge lamp drive voltage Vd is lower than 60V, the control section 40 executes setting so as not to insert the low frequency drive processing period (step S18).

Figure 16:
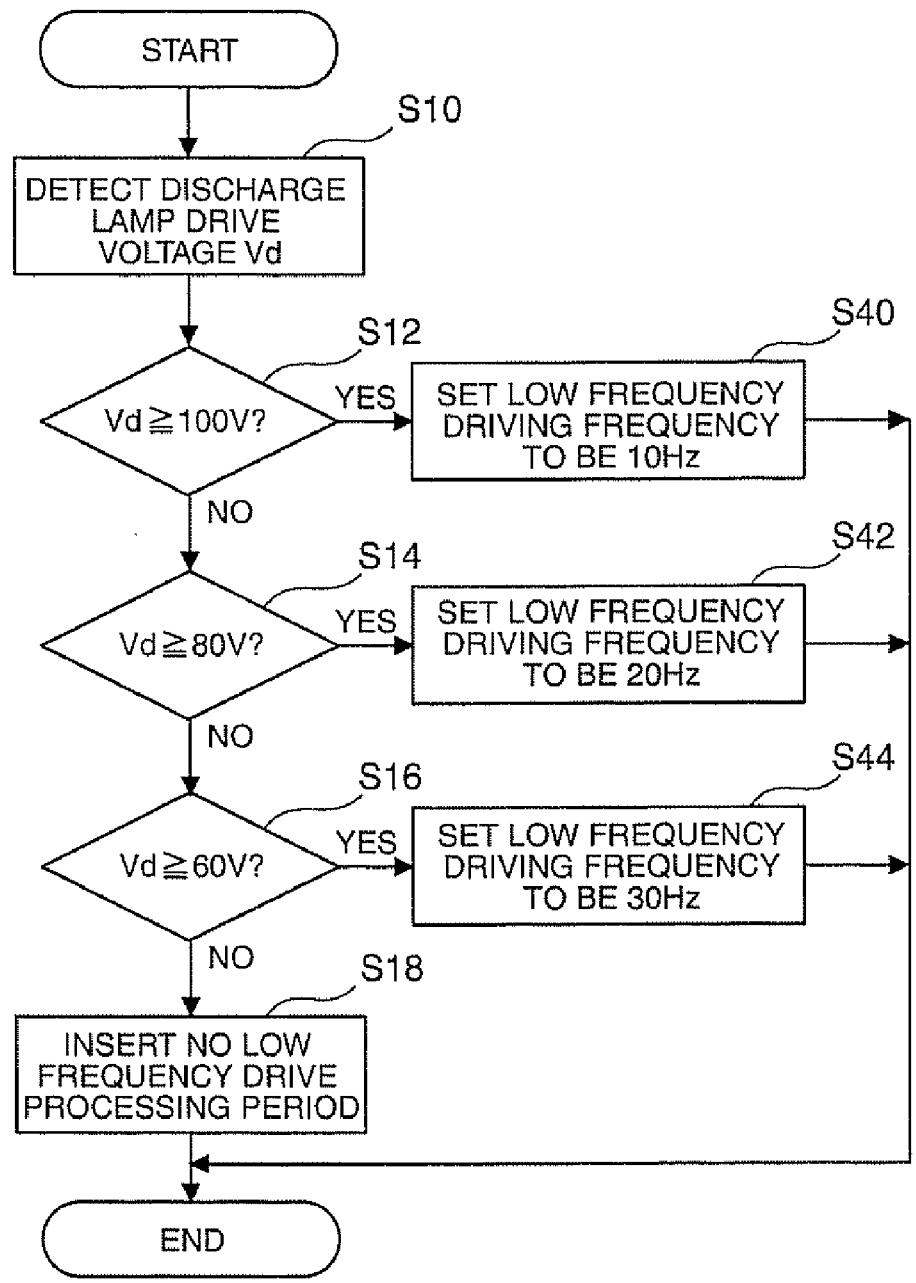
FIG. 16 is a flowchart of the case in which the low frequency driving frequency is varied in accordance with the discharge lamp drive voltage Vd.

FIG. 16 is a flowchart of the case in which the low frequency driving frequency is varied in accordance with the discharge lamp drive voltage Vd.

Firstly, the operation detection section 60 detects the discharge lamp drive voltage Vd (step S10). The control section 40 accepts the discharge lamp drive voltage Vd thus detected as the drive voltage information.

Subsequently, the control section 40 determines whether or not the discharge lamp drive voltage Vd is equal to or higher than 100V (step S12). If it is determined that the discharge lamp drive voltage Vd is equal to or higher than 100V, the control section 40 sets the low frequency driving frequency to be 10 Hz (step S40) The setting of the low frequency driving frequency is stored in, for example, the storage section 44.

If it is determined in the step S12 that the discharge lamp drive voltage Vd is lower than 100V, the control section 40 determines whether or not the discharge lamp drive voltage Vd is equal to or higher than 80V (step S14). If it is determined that the discharge lamp drive voltage Vd is equal to or higher than 80V, the control section 40 sets the low frequency driving frequency to be 20 Hz (step S42).

If it is determined in the step S14 that the discharge lamp drive voltage Vd is lower than 80V, the control section 40 determines whether or not the discharge lamp drive voltage Vd is equal to or higher than 60V (step S16). If it is determined that the discharge lamp drive voltage Vd is equal to or higher than 60V, the control section 40 sets the low frequency driving frequency to be 30 Hz (step S44).

If it is determined in the step S16 that the discharge lamp drive voltage Vd is lower than 60V, the control section 40 executes setting so as not to insert the low frequency drive processing period (step S18).

It should be noted that the control section 40 can select the corresponding setting from a table of the correspondence between the discharge lamp drive voltage Vd and each of the interval of the insertion of the low frequency drive processing period, the number of cycles included in the low frequency drive processing period, and the low frequency driving frequency as shown in FIG. 13 stored previously in the storage section 44 as described in the flowcharts shown in FIGS. 14 through 16, or can continuously vary at least one of the interval of the insertion of the low frequency drive processing period, the number of cycles included in the low frequency drive processing period, and the low frequency driving frequency in accordance with the discharge lamp drive voltage Vd detected by the operation detection section 60.

Further, it is also possible to vary two or more of the interval of the insertion of the low frequency drive processing period, the number of cycles included in the low frequency drive processing period, and the low frequency driving frequency in combination.

As described above, by controlling at least one of the interval of the insertion of the low frequency drive processing period, the number of cycles included in the low frequency drive processing period, and the low frequency driving frequency based on the discharge lamp drive voltage Vd, it is possible to drive the discharge lamp with appropriate setting corresponding to the condition of the electrode of the discharge lamp.

It should be noted that although the method of controlling at least one of the interval of the insertion of the low frequency drive processing period, the number of cycles included in the low frequency drive processing period, and the low frequency driving frequency based on the discharge lamp drive voltage Vd as an example of the condition of the electrode detected by the electrode condition detection section is explained, other detection methods for detecting, for example, a discharge lamp drive current and light intensity of the discharge lamp can be used as the electrode condition detection section, and it is also possible to use these methods in combination.

3. Circuit Configuration of Projector

Figure 17:
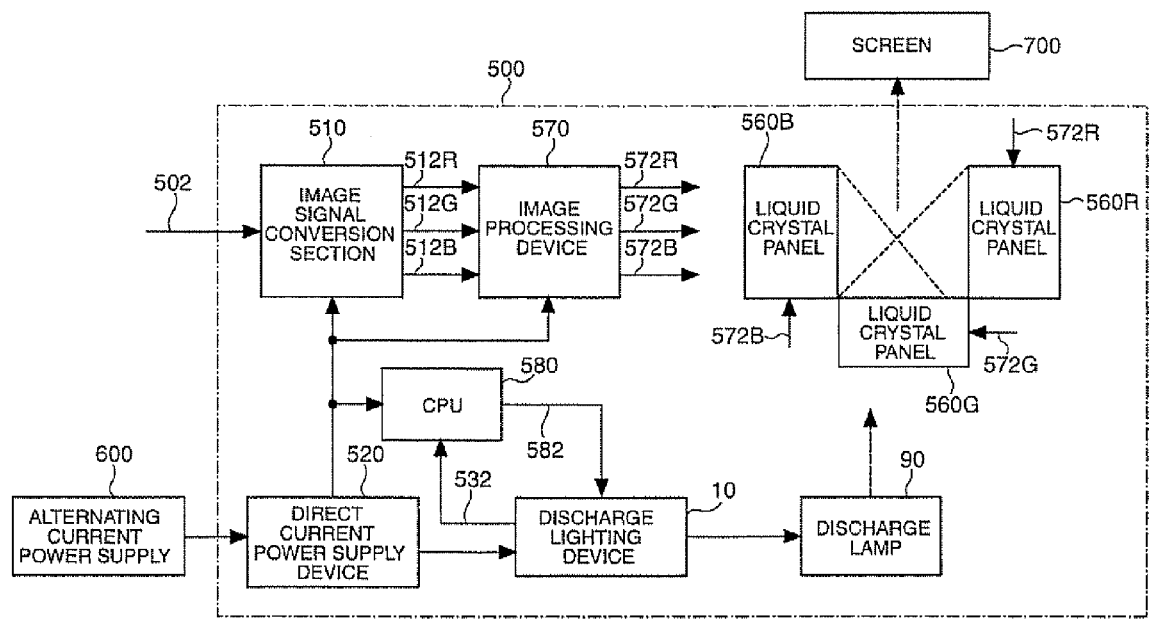
FIG. 17 is a diagram showing an example of a circuit configuration of a projector according to the present embodiment.

FIG. 17 is a diagram showing an example of a circuit configuration of a projector according to the present embodiment. The projector 500 includes an image signal conversion section 510, a direct current power supply device 520, the discharge lamp lighting device 10, the discharge lamp 90, liquid crystal panels 560R, 560G, 560B, and an image processing device 570 besides the optical system explained above.

The image signal conversion section 510 converts an image signal 502 (a luminance/color-difference signal, an analog RGB signal, and so on) input from the outside into a digital RGB signal of a predetermined word length to generate image signals 512R, 512G, 512B, and supplies the image processing device 570 with the image signals.

The image processing device 570 executes image processing on each of the three image signals 512R, 512G, 512B, and outputs drive signals 572R, 572G, 572B for respectively driving the liquid crystal panels 560R, 560G, 560B.

The direct current power supply device 520 converts the alternating current voltage supplied from an external alternating current power supply 600 into a constant direct current voltage, and supplies the direct current voltage to the image signal conversion section 510 and the image processing device 570 both disposed on the secondary side of a transformer (not shown, and included in the direct current power supply device 520), and the discharge lamp lighting device 10 disposed on the primary side of the transformer.

The discharge lamp lighting device 10 generates a high voltage between the electrodes of the discharge lamp 90 at the time of startup to cause dielectric breakdown for forming the discharge path, and then supplies a drive current for the discharge lamp 90 to maintain the discharge.

The liquid crystal panels 560R, 560G, 560B modulate the luminance of the colored light entering the respective liquid crystal panels in accordance with the drive signals 572R, 572G, 572B, respectively.

The central processing unit (CPU) 580 controls the operation of the projector from the beginning of lighting to the end of lighting. When power is applied to the projector and the output voltage of the direct current power supply device 520 reaches a predetermined value, the CPU 580 generates a lighting signal 582, and then supplies the discharge lamp lighting device 10 with the lighting signal 582. Further, the CPU 580 can receive lighting information 532 of the discharge lamp 90 from the discharge lamp lighting device 10.

Since the projector 500 configured as described above is capable of suppressing formation of the stationary convection inside the discharge lamp, thereby preventing the uneven consumption of the electrode and the uneven precipitation of the electrode material, it is possible to realize a projector capable of maintaining the projection luminance for a long period of time.

Although in each of the embodiments described above the explanations are presented exemplifying the projector using the three liquid crystal panels, the invention is not limited thereto, but can be applied to the projector using one, two, four, or more liquid crystal panels.

Although in each of the embodiments described above the explanations are presented exemplifying a transmissive projector, the invention is not limited thereto, but can also be applied to a reflective projector. It should be noted here that "transmissive" denotes that the electro-optic modulation device as the light modulation section is a type of transmitting a light beam such as a transmissive liquid crystal panel, and "reflective" denotes that the electro-optic modulation device as the light modulation section is a type of reflecting a light beam such as a reflective liquid crystal panel or a micromirror light modulation device. As the micromirror light modulation device, for example, a digital micromirror device (DMD, a trademark of Texas Instruments) can be used. Also in the case in which the invention is applied to the reflective projector, the same advantages as in the case with the transmissive projector can be obtained.

The invention can be applied to a front projection projector for performing projection from the side of observing the projection image, and also to a rear projection projector for performing projection from the side opposite to the side of observing the projection image.

It should be noted that the present invention is not limited to the embodiments described above, but can be put into practice with various modification within the scope or the spirit of the invention.

The present invention includes configurations (e.g., configurations having the same function, the same way, and the same result, or configurations having the same object and the same advantages) substantially the same as those described in the embodiment section. Further, the invention includes configurations obtained by replacing a non-essential part of the configuration described in the embodiment section. Further, the invention includes configurations offering the same advantage or configurations capable of achieving the same object as the configuration described in the embodiment section. Further, the invention includes configurations obtained by adding technology known to the public to the configuration described in the embodiment section.

The entire disclosure of Japanese Patent Application No. 2008-273003, filed Oct. 23, 2008 is expressly incorporated by reference herein.

What is claimed is:

1. A discharge lamp lighting device comprising:
a power control circuit adapted to generate discharge lamp driving power;
an alternating current conversion circuit adapted to execute polarity reversal on a direct current output from the power control circuit at given timing, thereby generating and outputting an alternating current for driving the discharge lamp; and
a control section adapted to perform alternating current conversion control of controlling the polarity reversal timing of the alternating current for driving the discharge lamp with respect to the alternating current conversion circuit,
wherein the control section executes
a steady drive process of executing the alternating current conversion control at a given frequency,
a first low frequency drive process of executing the alternating current conversion control at a first low frequency driving frequency lower than the given frequency, and starting from a first polarity and ending with the first polarity, and
a second low frequency drive process of executing the alternating current conversion control at a second low frequency driving frequency lower than the given frequency, and starting from a second polarity and ending with the second polarity.

2. The discharge lamp lighting device according to claim 1, wherein
the control section executes the alternating current conversion control of alternately repeating a first low frequency wave insertion period and a second low frequency wave insertion period,
in the first low frequency wave insertion period, the control section executes a process of inserting, a plurality of times, a first low frequency drive processing period for executing the first low frequency drive process into a period of executing the steady drive process, and
in the second low frequency wave insertion period, the control section executes a process of inserting, a plurality of times, a second low frequency drive processing period for executing the second low frequency drive process into the period of executing the steady drive process.

3. The discharge lamp lighting device according to claim 2, wherein
the control section executes the alternating current conversion control of varying at least one of an interval of insertion of the first low frequency drive processing period inserted in the first low frequency wave insertion period and an interval of insertion of the second low frequency drive processing period inserted in the second low frequency wave insertion period.

4. The discharge lamp lighting device according to claim 2, wherein
the control section executes the alternating current conversion control of varying at least one of a number of cycles included in the first low frequency drive processing period and a number of cycles included in the second low frequency drive processing period.

5. The discharge lamp lighting device according to claim 2, wherein
the control section executes the alternating current conversion control of setting a length of time of at least one of a first 1/2 cycle and a last 1/2 cycle in the first low frequency drive processing period and the second low frequency drive processing period larger than a length of time of any other 1/2 cycle in the first low frequency drive processing period and the second low frequency drive processing period.

6. The discharge lamp lighting device according to claim 2, wherein
the control section executes, on the power control circuit, current control of controlling a current value of a direct current output by the power control circuit, and
in the current control, the control section executes control of setting a maximum current value in at least one of a first 1/2 cycle and a last 1/2 cycle in the first low frequency drive processing period and the second low frequency drive processing period larger than any other current value in the first low frequency drive processing period and the second low frequency drive processing period.

7. The discharge lamp lighting device according to claim 2, wherein
the discharge lamp includes
a first electrode functioning as an anode in the first polarity,
a second electrode functioning as the anode in the second polarity,
a main reflecting mirror disposed on a side of the first electrode, and adapted to reflect a light beam generated by discharge between the first electrode and the second electrode and emit the light beam toward an illuminated area, and
a sub-reflecting mirror disposed on a side of the second electrode so as to be opposed to the main reflecting mirror, and adapted to reflect a light beam from an inter-electrode space between the first electrode and the second electrode, toward a side of the inter-electrode space.

8. A projector comprising:
the discharge lamp lighting device according to claim 2.

9. The discharge lamp lighting device according to claim 7, wherein
the control section executes the alternating current conversion control of setting the interval of insertion of the second low frequency drive processing period inserted in the second low frequency wave insertion period to be longer than the interval of insertion of the first low frequency drive processing period inserted in the first low frequency wave insertion period.

10. The discharge lamp lighting device according to claim 7, wherein
the control section executes the alternating current conversion control of setting the number of cycles included in the second low frequency drive processing period to be larger than the number of cycles included in the first low frequency drive processing period.

11. The discharge lamp lighting device according to claim 7, wherein
the control section executes the alternating current conversion control of setting the second low frequency driving frequency to be higher than the first low frequency driving frequency.

12. A projector comprising:
the discharge lamp lighting device according to claim 7.

13. The discharge lamp lighting device according to claim 1, wherein
the control section executes the alternating current conversion control of varying at least one of the first low frequency driving frequency and the second low frequency driving frequency.

14. The discharge lamp lighting device according to claim 1, further comprising:
an electrode condition detection section adapted to detect an electrode condition of the discharge lamp,
wherein the control section executes the alternating current conversion control based on the electrode condition.

15. A projector comprising:
the discharge lamp lighting device according to claim 1.

16. The discharge lamp lighting device according to claim 1, wherein
the discharge lamp includes
a first electrode functioning as an anode in the first polarity,
a second electrode functioning as the anode in the second polarity,
a main reflecting mirror disposed on a side of the first electrode, and adapted to reflect a light beam generated by discharge between the first electrode and the second electrode and emit the light beam toward an illuminated area, and
a sub-reflecting mirror disposed on a side of the second electrode so as to be opposed to the main reflecting mirror, and adapted to reflect a light beam from an inter-electrode space between the first electrode and the second electrode, toward a side of the inter-electrode space.

17. A method of controlling a discharge lamp lighting device, comprising a power control circuit adapted to generate discharge lamp driving power, and an alternating current conversion circuit adapted to generate and output an alternating current for driving the discharge lamp by executing polarity reversal on a direct current output by the power control circuit at given timing; the method of the discharge lamp lighting device comprising;
generating and outputting the alternating current for driving the discharge lamp at a given frequency;
generating and outputting the alternating current at a first low frequency driving frequency lower than the given frequency, and starting from a first polarity and ending with the first polarity; and
generating and outputting the alternating current at a second low frequency driving frequency lower than the given frequency, and starting from a second polarity and ending with the second polarity.

* * * * *